(12) United States Patent
Kodama

(10) Patent No.: US 12,309,515 B2
(45) Date of Patent: May 20, 2025

(54) IMAGING DEVICE AND IMAGING METHOD

(71) Applicant: SONY SEMICONDUCTOR SOLUTIONS CORPORATION, Kanagawa (JP)

(72) Inventor: Kazutoshi Kodama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 253 days.

(21) Appl. No.: 18/001,144

(22) PCT Filed: Apr. 27, 2021

(86) PCT No.: PCT/JP2021/016707
§ 371 (c)(1),
(2) Date: Dec. 8, 2022

(87) PCT Pub. No.: WO2021/256095
PCT Pub. Date: Dec. 23, 2021

(65) Prior Publication Data
US 2023/0217127 A1    Jul. 6, 2023

(30) Foreign Application Priority Data
Jun. 18, 2020  (JP) ................ 2020-105582

(51) Int. Cl.
*H04N 25/709* (2023.01)
*H04N 23/60* (2023.01)
*H04N 25/772* (2023.01)

(52) U.S. Cl.
CPC ......... *H04N 25/709* (2023.01); *H04N 23/665* (2023.01); *H04N 25/772* (2023.01)

(58) Field of Classification Search
CPC .. H04N 25/709; H04N 23/665; H04N 25/772; H04N 25/618; H04N 25/74;
(Continued)

(56) References Cited

U.S. PATENT DOCUMENTS 9,176,608 B1 * 11/2015 Baldwin ............... G09G 5/00
9,936,132 B2 * 4/2018 Yoon .................... H04N 25/42
(Continued)

FOREIGN PATENT DOCUMENTS

JP    2020-088481 A    6/2020
JP    2020-088724 A    6/2020
WO   2019/087471 A1    5/2019

OTHER PUBLICATIONS

International Search Report and Written Opinion of PCT Application No. PCT/JP2021/016707, issued on Aug. 3, 2021, 08 pages of ISRWO.

*Primary Examiner* — Lin Ye
*Assistant Examiner* — Chan T Nguyen
(74) *Attorney, Agent, or Firm* — CHIP LAW GROUP

(57) ABSTRACT

There is no risk of generating unnecessary events.
This imaging device comprises: a photoelectric conversion unit that has a plurality of photoelectric conversion elements for performing photoelectric conversion to generate an electric signal; a setting unit that sets a threshold value according to a noise level in a predetermined region among the plurality of photoelectric conversion elements; and a first detection unit that detects a detection signal in a case where the amount of change in the electric signal generated by the plurality of photoelectric conversion elements exceeds the threshold value.

17 Claims, 25 Drawing Sheets

(58) Field of Classification Search
CPC .... H04N 25/47; H04N 23/651; H04N 25/617; H04N 25/707
USPC ......................................................... 348/294
See application file for complete search history.

(56) References Cited

U.S. PATENT DOCUMENTS

| | | | | |
|---|---|---|---|---|
| 2009/0066782 | A1* | 3/2009 | Choi | ................... H04N 25/46 |
| | | | | 348/E5.022 |
| 2010/0302397 | A1* | 12/2010 | Huang | ................ H04N 23/651 |
| | | | | 348/222.1 |
| 2019/0327440 | A1* | 10/2019 | Hoshino | ................ H04N 25/78 |
| 2020/0260032 | A1* | 8/2020 | Niwa | ..................... H04N 25/47 |

\* cited by examiner

IMAGING DEVICE AND IMAGING METHOD

CROSS REFERENCE TO RELATED APPLICATIONS

This application is a U.S. National Phase of International Patent Application No. PCT/JP2021/016707 filed on Apr. 27, 2021, which claims priority benefit of Japanese Patent Application No. JP 2020-105582 filed in the Japan Patent Office on Jun. 18, 2020. Each of the above-referenced applications is hereby incorporated herein by reference in its entirety.

TECHNICAL FIELD

The present disclosure relates to an imaging device and an imaging method.

BACKGROUND ART

A synchronous solid-state imaging element that captures image data (frames) in synchronization with a synchronization signal such as a vertical synchronization signal is used in an imaging device or the like. The typical synchronous solid-state imaging element described above can acquire image data only in each cycle (for example, 1/60 seconds) of a synchronization signal, and thus, is difficult to respond to demands for high-speed processing in fields of traffic, robots, and the like. In view of this, an asynchronous solid-state imaging element having a detection circuit for each pixel has been proposed, the detection circuit detecting, for each pixel address, that an amount of light of the pixel exceeds a threshold value as an address event in real time. The solid-state imaging element that detects an address event for each pixel as described above is called a dynamic vision sensor (DVS). DVS can generate and output data at a much higher speed than a synchronous solid-state imaging element. For this reason, it can execute processing for recognizing an image of people or obstacles at high speed and improve safety in the traffic field, for example.

CITATION LIST

Patent Document

Patent Document 1: WO 2019/087471

SUMMARY OF THE INVENTION

Problems to be Solved by the Invention

On the other hand, it may be required to display a higher-definition image than a DVS image based on a detection signal generated by a DVS pixel. However, when the DVS image and the higher-definition gradation image are simultaneously acquired, a power supply voltage fluctuates between an imaging period of the DVS image and a blanking period of the DVS image, so that AD characteristics used for acquiring the gradation image are affected by coupling with the fluctuation of the power supply voltage.

In view of this, the present disclosure provides an imaging device and an imaging method with which it is possible to suppress fluctuations in power supply voltage.

Solutions to Problems

In order to address the above problems, the present disclosure provides an imaging device including:
a pixel array section including a plurality of dynamic vision sensor (DVS) pixels that outputs an output signal according to an amount of light, and a plurality of first circuits that respectively corresponds to the plurality of DVS pixels and outputs a detection signal indicating occurrence of an address event in a case where the output signal of the corresponding DVS pixel exceeds a predetermined threshold value;
a second circuit section capable of performing power consumption corresponding to the plurality of DVS pixels and the plurality of first circuits according to a control signal; and
a control circuit that has a first control period in which the plurality of first circuits is driven and a second control period in which the plurality of first circuits is not driven, the control circuit performing control to drive the second circuit section during the second control period using the control signal.

The second circuit section may include
a plurality of pixels that outputs output signals in accordance with the control signal.

Each of the plurality of pixels may output an output signal according to a voltage to be applied.

The second circuit section may further include
a plurality of second circuits that outputs a detection signal indicating occurrence of an address event in a case where the output signal of the corresponding pixel exceeds a predetermined threshold value.

The second circuit section may be capable of adjusting power consumption according to a voltage to be applied, and
the imaging device may further include a first voltage source that applies a voltage to the second circuit section according to the control signal.

In the second circuit section, power consumption may be different between a first potential to be applied and a second potential higher than the first potential, and
the first voltage source may be capable of outputting a pulsed voltage that repeats the first potential and a period of the second potential higher than the first potential according to the control signal.

Each of the plurality of second circuits may not exceed the predetermined threshold value at the first potential, and may exceed the predetermined threshold value at the second potential.

The controller may be capable of outputting a plurality of pulsed voltages, and may change a pattern of the pulsed voltages according to power consumption of the plurality of DVS pixels and the plurality of first circuits.

The controller may change the pattern of the pulsed voltages according to a number of address events detected by the plurality of first circuits at a predetermined time interval.

The controller may change the pattern of the pulsed voltages according to a number of address events detected by the plurality of first circuits for several rows from the last row in terms of a reading order.

The second circuit section may be capable of adjusting power consumption according to a voltage to be applied,
the imaging device may further include a first voltage source that applies a voltage to the second circuit section in response to the control signal, and a second voltage source having a potential lower than a potential of the first voltage source, and in the second circuit section, power consumption may be different according to a potential difference between the first voltage source and the second voltage source.

Each of the plurality of pixels may be connected between the first voltage source and the second voltage source, and a number of the plurality of pixels exceeding the predetermined threshold value may be controllable according to the potentials of the first voltage source and the second voltage source.

The pixel array section may further include a plurality of gradation pixels, and the imaging device may be capable of generating a DVS image based on output signals of the plurality of DVS pixels and a gradation image based on output signals of the plurality of gradation pixels.

The plurality of DVS pixels may be arranged in a matrix in the pixel array section, and output signals may be read according to an order of rows of the pixel array section.

The second control period may correspond to a vertical blanking period of the plurality of DVS pixels.

The second control period may correspond to a horizontal blanking period of the plurality of DVS pixels.

The present disclosure provides an imaging method for a pixel array section including a plurality of dynamic vision sensor (DVS) pixels that outputs an output signal according to an amount of light and a plurality of first circuits that respectively corresponds to the plurality of DVS pixels and outputs a detection signal indicating occurrence of an address event in a case where the output signal of the corresponding DVS pixel exceeds a predetermined threshold value, the method including a first control period in which the plurality of first circuits is driven and a second control period in which the plurality of first circuits is not driven, the method including driving a second circuit section in the second control period, the second circuit section being capable of performing power consumption corresponding to the plurality of DVS pixels and the plurality of first circuits.

MODE FOR CARRYING OUT THE INVENTION

Embodiments of an imaging device and an imaging method will be described below with reference to the drawings. Although main components of the imaging device will be mainly described below, the imaging device may have components and functions that are not illustrated or described. The following description does not exclude components and functions that are not illustrated or described.

First Embodiment

Configuration Example of Imaging Device

Figure 1:
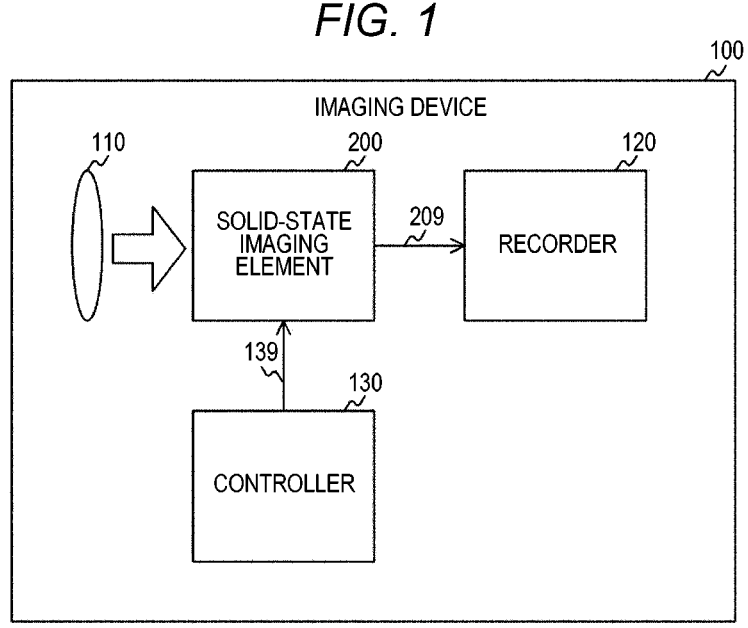
FIG. 1 is a block diagram illustrating an example of a configuration of an image device to which a technology according to the present disclosure is applied.

FIG. 1 is a block diagram illustrating a configuration example of an imaging device 100 according to an embodiment of the present technology. The imaging device 100 includes an imaging lens 110, a solid-state imaging element 200, a recorder 120, and a controller 130. As the imaging device 100, a camera mounted on a wearable device, an in-vehicle camera, or the like is assumed.

The imaging lens 110 collects incident light and guides the light to the solid-state imaging element 200. The solid-state imaging element 200 includes a DVS pixel and a gradation pixel. Furthermore, the solid-state imaging element 200 can detect that the absolute value of an amount of change in luminance in the DVS pixel exceeds a threshold value as an address event. The address event includes, for example, an on-event indicating that an amount of increase in luminance exceeds an upper limit threshold value and an off-event indicating that an amount of decrease in luminance falls below a lower limit threshold value less than the upper limit threshold value. In addition, the solid-state imaging element 200 generates a detection signal indicating the detection result of the address event for each DVS pixel. Each of the detection signals includes an on-event detection signal VCH indicating whether or not the on-event occurs and an off-event detection signal VCL indicating whether or not the off-event occurs. Note that, although the solid-state imaging element 200 detects the occurrence of both the on-event and the off-event, it can detect only one of them. Furthermore, the DVS pixel according to the present embodiment can output a DVS luminance signal in addition to the detection signal. As a result, a first DVS image based on the detection signal of the DVS pixel and a second DVS image based on the luminance signal of the DVS pixel are formed.

Meanwhile, the gradation pixel outputs a gradation luminance signal. A gradation image is formed based on the gradation luminance signal output from the gradation pixel. Note that, in the present embodiment, an image based on the detection signal of the DVS pixel is referred to as a first DVS image, an image based on the luminance signal of the DVS pixel is referred to as a second DVS image, and an image based on the gradation luminance signal output from the gradation pixel is referred to as a gradation image.

The solid-state imaging element 200 performs predetermined signal processing such as image recognition processing on the first DVS image, the second DVS image, and the gradation image, and outputs the processed data to the recorder 120 via a signal line 209.

The recorder 120 records data from the solid-state imaging element 200. The controller 130 controls the solid-state imaging element 200 to capture image data.

Configuration Example of Solid-State Imaging Element

Figure 2:
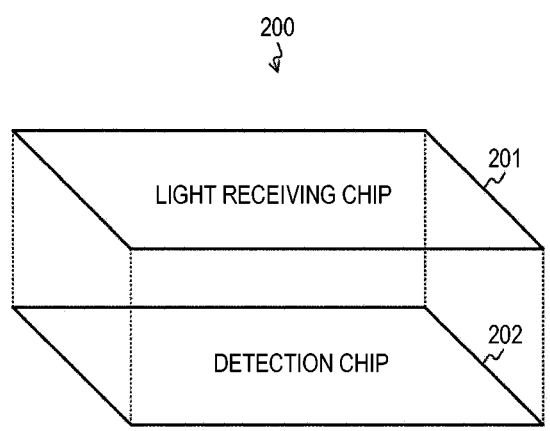
FIG. 2 is a diagram illustrating an example of a stacked structure of a solid-state imaging element.

FIG. 2 is a diagram illustrating an example of a stacked structure of the solid-state imaging element 200 according to the embodiment of the present technology. The solid-state imaging element 200 includes a detection chip 202 and a light receiving chip 201 stacked on the detection chip 202. These substrates are electrically connected via a connection portion such as a via. Note that they can be connected using Cu—Cu bonding or a bump instead of via.

Figure 3:
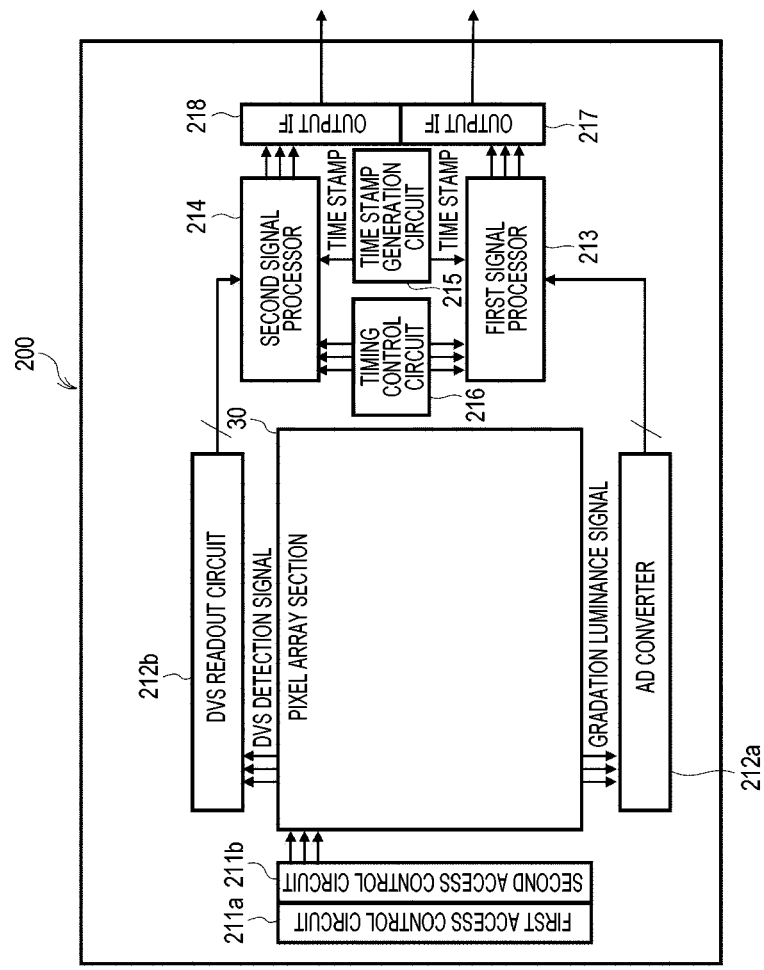
FIG. 3 is a block diagram illustrating a configuration example of the solid-state imaging element.

FIG. 3 is a block diagram illustrating a configuration example of the solid-state imaging element 200. As illustrated in FIG. 3, the solid-state imaging element 200 according to the present disclosure is a device capable of performing asynchronous imaging called DVS and synchronous imaging for a gradation image in parallel. The solid-state imaging element 200 includes a pixel array section 30, a first access control circuit 211a, a second access control circuit 211b, an AD converter 212a, a DVS readout circuit 212b, a first signal processor 213, a second signal processor 214, a time stamp generation circuit 215, a timing control circuit 216, and output interfaces 217 and 218.

Figure 4:
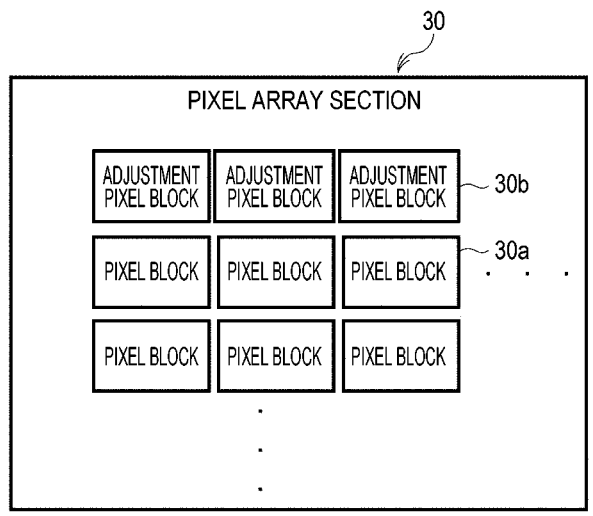
FIG. 4 is a diagram schematically illustrating pixel blocks and adjustment pixel blocks arranged in a matrix.
Figure 5:
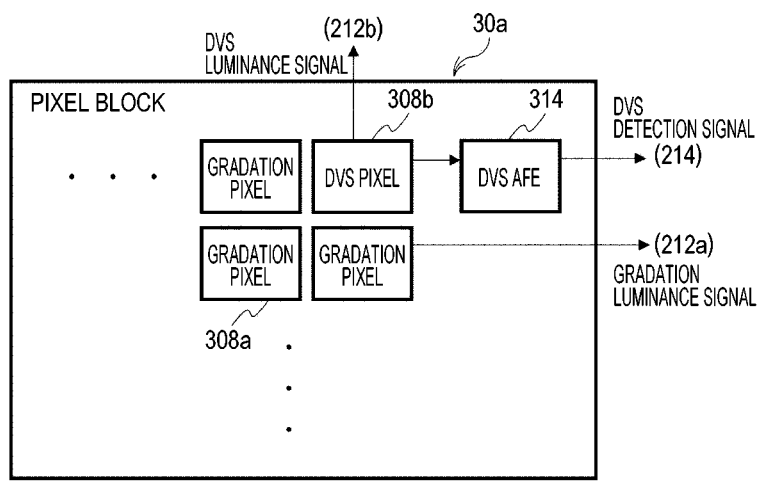
FIG. 5 is a diagram schematically illustrating a configuration of a pixel block.
Figure 6:
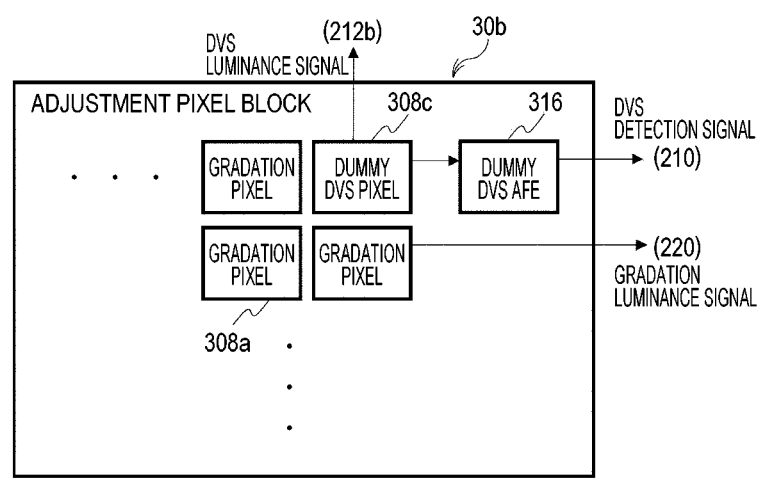
FIG. 6 is a diagram schematically illustrating a configuration of an adjustment pixel block.

Here, the configuration of the pixel array section 30 will be described with reference to FIGS. 4 to 6. FIG. 4 is a diagram schematically illustrating pixel blocks 30a and adjustment pixel blocks 30b arranged in a matrix in the pixel array section 30. As illustrated in FIG. 4, a plurality of pixel blocks 30a and a plurality of adjustment pixel blocks 30b are two-dimensionally arranged in a matrix (array) in the pixel array section 30.

First, the configuration of the pixel block 30a will be described with reference to FIG. 5. FIG. 5 is a diagram schematically illustrating a configuration of the pixel block 30a. As illustrated in FIG. 5, the pixel block 30a includes a plurality of gradation pixels 308a, a DVS pixel 308b, and a DVS analog front end (AFE) 314. The plurality of gradation pixels 308a and the DVS pixel 308b are arranged in a matrix in the pixel block 30a. With respect to this pixel array, a vertical signal line VSL1 to be described later is wired for each pixel column of the gradation pixels 308a. Furthermore, a vertical signal line VSL2 independent of the vertical signal line VSL1 is wired for each pixel column of the DVS pixel 308b. Each of the plurality of gradation pixels 308a generates an analog signal of a voltage corresponding to a photocurrent as a gradation luminance signal and outputs the generated signal to the AD converter 212a (see FIG. 3). Note that the DVS AFE 314 according to the present embodiment corresponds to a first circuit.

On the other hand, the DVS pixel 308b outputs an analog signal of a voltage corresponding to the photocurrent to the DVS AFE 314. In addition, the DVS pixel 308b generates an analog signal of a voltage corresponding to the photocurrent as a DVS luminance signal, and outputs the generated signal to the DVS readout circuit 212b (see FIG. 3) in a case where an address event occurs.

The DVS analog front end (AFE) 314 generates a detection signal from a voltage signal based on the output of the DVS pixel 308b, and outputs the detection signal to the second signal processor 214 (see FIG. 3). More specifically, the DVS AFE 314 detects whether or not an address event occurs based on whether or not an amount of change in the photocurrent in the DVS pixel 308b exceeds a predetermined threshold value. Then, the DVS AFE 314 outputs the detection signal to the second signal processor 214. For example, the DVS AFE 314 outputs address information (X, Y), time stamp information T, and address event information VCH and VCL of the detected active pixel to the second signal processor 214 as, for example, event information (X, Y, T, VCH, VCL). In addition, the DVS AFE 314 is configured in the detection chip 202. The plurality of gradation pixels 308a, the DVS pixel 308b, and the DVS AFE 314 can operate in parallel by an independent control system. Note that the detailed configurations of the gradation pixels 308a, the DVS pixel 308b, and the DVS AFE 314 will be described later.

Next, the configuration of the adjustment pixel block 30b will be described with reference to FIG. 6. FIG. 6 is a diagram schematically illustrating a configuration of the adjustment pixel block 30b. As illustrated in FIG. 6, the adjustment pixel block 30b is capable of controlling voltage drop of a power supply voltage VDD2 and the like in the pixel array section 30. The adjustment pixel block 30b includes a plurality of gradation pixels 308a, a dummy DVS pixel 308c, and a dummy DVS AFE 316. That is, the adjustment pixel block 30b includes the dummy DVS pixel 308c instead of the DVS pixel 308b. The dummy DVS pixel 308c is capable of controlling an output signal by a control signal without depending on the received amount of light. Note that, although each adjustment pixel block 30b includes one dummy DVS pixel 308c and one dummy DVS AFE 316 in the present embodiment, the configuration is not limited thereto. For example, the adjustment pixel block 30b may include a plurality of dummy DVS pixels 308c and a plurality of dummy DVS AFEs 316. In addition, the plurality of adjustment pixel blocks 30b according to the present embodiment corresponds to a second circuit section, and the dummy DVS pixel 308c corresponds to a pixel.

The dummy DVS AFE 316 detects whether or not an address event occurs based on whether or not an amount of change in the voltage signal based on the output from the dummy DVS pixel 308c exceeds a predetermined threshold value.

In this manner, the detection signal of the dummy DVS AFE 316 of the adjustment pixel block 30b is controlled by the control signal for the dummy DVS pixel 308c. In addition, the DVS AFE 316 is configured in the detection chip 202. Note that the detailed configurations of the dummy DVS pixel 308c and the dummy DVS AFE 316 will also be described later.

Returning to FIG. 3 again, the first access control circuit 211a controls the plurality of gradation pixels 308a. The first access control circuit 211a controls resetting of accumulated electric charges of each of the plurality of gradation pixels 308a, generation of a gradation luminance signal according to an accumulation amount of a photoelectric conversion current, output of a gradation luminance signal, and the like. For example, the first access control circuit 211a allows the AD converter 212a to sequentially output the photoelectric conversion current accumulated in each of the plurality of gradation pixels 308a as a gradation luminance signal for each row. Note that details of the control operation of the gradation pixel 308a will be described later.

The second access control circuit 211b controls the plurality of DVS AFEs 314, the plurality of dummy DVS pixels 308c, and the plurality of dummy DVS AFEs 316. The second access control circuit 211b according to the present embodiment allows the plurality of DVS AFEs 314 to sequentially detect an address event for each row, and allows the second signal processor 214 to sequentially output the detection signal for each row. In addition, the second access control circuit 211b sequentially outputs the luminance signal of the DVS pixel 308b in which the address event is detected to the DVS readout circuit 212b for each row. Furthermore, the second access control circuit 211b controls the plurality of dummy DVS AFEs 314 to adjust a voltage drop of the power supply voltage VDD or the like. Note that the detailed configurations of the DVS AFE 314, the dummy DVS pixel 308c, and the dummy DVS AFE 316 will also be described later. Note that the second access control circuit 211b according to the present embodiment corresponds to a control circuit.

Figure 7:
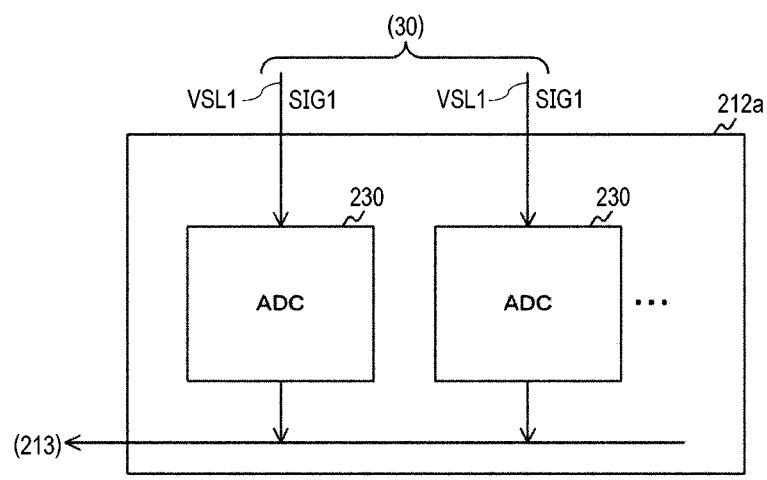
FIG. 7 is a block diagram illustrating a configuration example of an AD conversion unit.

A configuration example of the AD converter 212a will be described with reference to FIG. 7. FIG. 7 is a block diagram illustrating a configuration example of the AD converter 212a. The AD converter 212a includes an ADC 230 for each column of the gradation pixels 308a arranged for each of the pixel blocks 30a and 30b. The ADC 230 converts the analog gradation luminance signal SIG supplied via the vertical signal line VSL1 into a digital signal. This digital signal is converted into a digital pixel signal having a bit length larger than that of the gradation luminance signal SIG1. For example, assuming that the gradation luminance signal SIG1 has two bits, the pixel signal is converted into a digital signal of three bits or more (16 bits or the like). The ADC 230 supplies the generated digital signal to the first signal processor 213.

Figure 8:
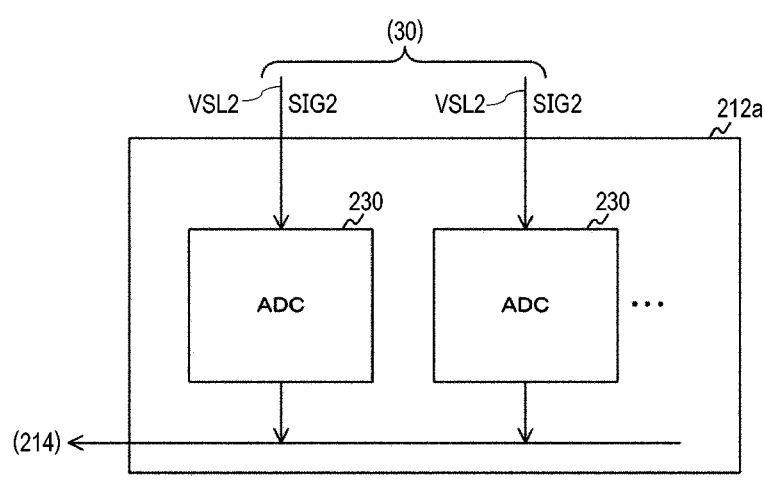
FIG. 8 is a block diagram illustrating a configuration example of a DVS readout circuit.

A configuration example of the DVS readout circuit 212b will be described with reference to FIG. 8. FIG. 8 is a block diagram illustrating a configuration example of the DVS readout circuit 212b. The DVS readout circuit 212b includes the ADC 230 for each column of the DVS pixels 308b arranged for each of the pixel blocks 30a and 30b. The ADC 230 converts the analog DVS luminance signal SIG2 supplied via the vertical signal line VSL2 into a digital signal. This digital signal is converted into a digital pixel signal having a bit length larger than that of the DVS luminance signal SIG2. For example, assuming that the DVS luminance signal SIG2 has two bits, the pixel signal is converted into a digital signal of three bits or more (16 bits or the like). The ADC 230 supplies the generated digital signal to the second signal processor 214.

As illustrated in FIG. 3 again, the first signal processor 213 executes predetermined signal processing such as correlated double sampling (CDS) processing and image recognition processing on the digital signal from the AD converter 212a. The signal processor 212 supplies data indicating a processing result and a detection signal to the recorder 120 via the signal line 209.

The second signal processor 214 performs predetermined signal processing on the detection signals from the plurality of DVS AFEs 314. For example, the second signal processor 214 arranges the detection signals as pixel signals in a two-dimensional lattice pattern to generate a first DVS image. In addition, the second signal processor 214 generates a second DVS image on the basis of the digital signal supplied from the DVS readout circuit 212b. Then, the second signal processor 214 executes image processing such as image recognition processing on the first DVS image and the second DVS image.

The time stamp generation circuit 215 generates the time stamp information T and supplies the time stamp information T to each component of the solid-state imaging element 200. For example, the time stamp generation circuit 215 supplies the time stamp information T to the plurality of DVS AFEs 314 and the plurality of dummy DVS AFEs 316.

The timing control circuit 216 controls the timing of each component of the solid-state imaging element 200. For example, the timing control circuit 216 controls timings of the first access control circuit 211a and the second access control circuit 211b.

The output interface 217 outputs the image data and the like supplied from the first signal processor 213 to the recorder 120. Similarly, the output interface 218 outputs the image data and the like supplied from the second signal processor 214 to the recorder 120.

Figure 9:
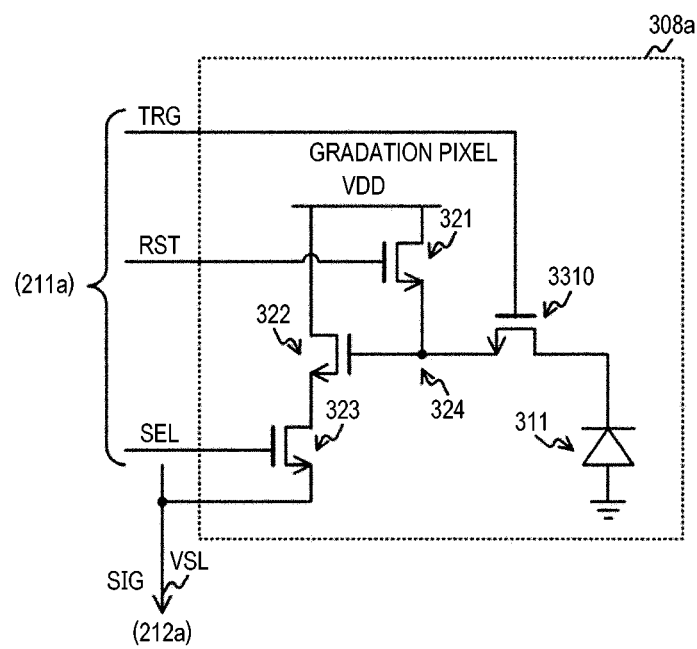
FIG. 9 is a diagram illustrating a configuration example of a gradation pixel.

Here, the detailed configuration example and control operation example of the gradation pixel 308a will be described with reference to FIG. 9. FIG. 9 is a diagram illustrating a configuration example of the gradation pixel 308a. As illustrated in FIG. 9, the gradation pixel 308a includes a reset transistor 321, an amplification transistor 322, a selection transistor 323, a floating diffusion layer 324, and a light receiver 330.

For example, an N-type metal-oxide-semiconductor (MOS) transistor is used as the reset transistor 321, the amplification transistor 322, the selection transistor 323, and a transfer transistor 3310. In addition, a photoelectric conversion element 311 is disposed on the light receiving chip 201. All the elements other than the photoelectric conversion element 311 are arranged on the detection chip 202.

The photoelectric conversion element 311 photoelectrically converts incident light to generate electric charge.

The electric charge photoelectrically converted by the photoelectric conversion element 311 is supplied from the photoelectric conversion element 311 to the floating diffusion layer 324 by the transfer transistor 3310. The electric charge supplied from the photoelectric conversion element 311 is accumulated in the floating diffusion layer 324. The floating diffusion layer 324 generates a voltage signal having a voltage value corresponding to the amount of accumulated electric charges.

The amplification transistor 322 is connected in series with the selection transistor 323 between a power supply line of the power supply voltage VDD and the vertical signal line VSL1. The amplification transistor 322 amplifies the voltage signal subjected to charge-voltage conversion by the floating diffusion layer 324.

A selection signal SEL is supplied from the first access control circuit 211a to a gate electrode of the selection transistor 323. The selection transistor 323 outputs, in response to the selection signal SEL, the voltage signal amplified by the amplification transistor 322 to the AD converter 212a (see FIG. 3) via the vertical signal line VSL1 as the pixel signal SIG.

Example of Circuit Configuration of DVS Pixel

Figure 10:
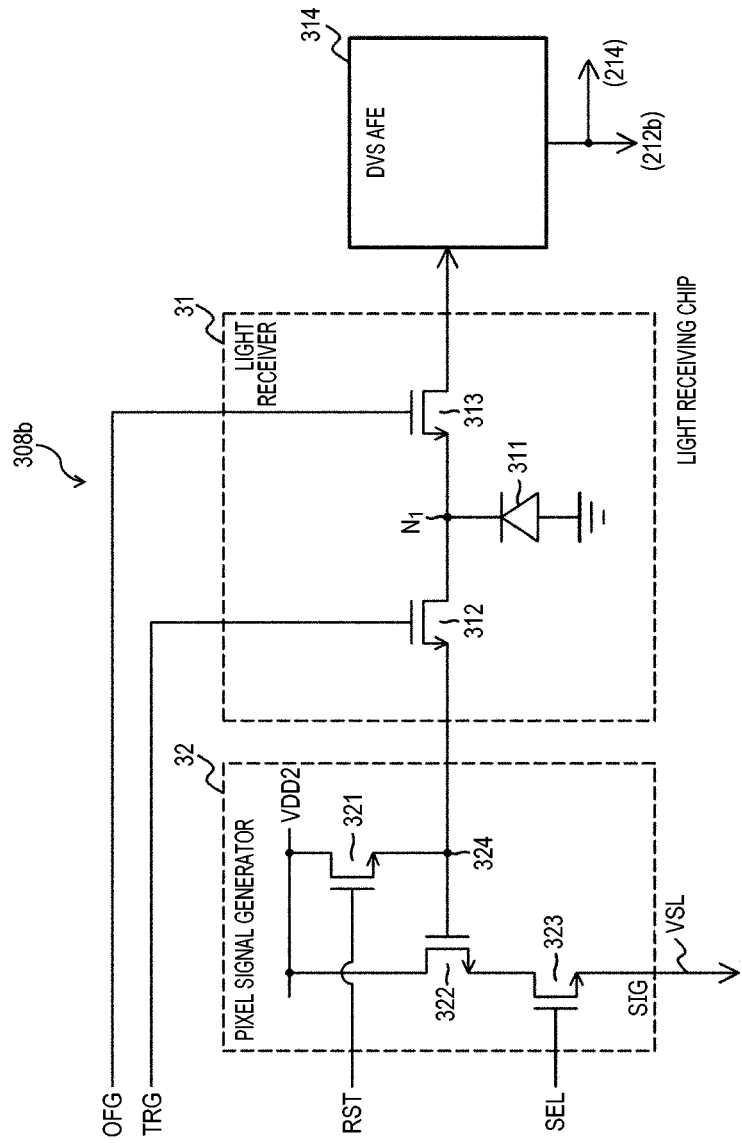
FIG. 10 is a diagram illustrating a configuration example of a DVS pixel.

Here, the detailed configuration example of the DVS pixel 308b will be described with reference to FIG. 10. FIG. 10 is a diagram illustrating a configuration example of the DVS pixel 308b. Each of the plurality of DVS pixels 308b includes a light receiver 31, a pixel signal generator 32, and the DVS AFE 314.

In the DVS pixel 308b having the above configuration, the light receiver 31 includes a light receiving element (photoelectric conversion element) 311, a transfer transistor 312, and an over flow gate (OFG) transistor 313. For example, an N-type metal-oxide-semiconductor (MOS) transistor is used as the transfer transistor 312 and the OFG transistor 313. The transfer transistor 312 and the OFG transistor 313 are connected in series with each other.

The light receiving element 311 is connected between a connection node N1 common to the transfer transistor 312 and the OFG transistor 313 and the ground, and photoelectrically converts the incident light to generate electric charges in an amount corresponding to the amount of the incident light.

A transfer signal TRG is supplied from the second access control circuit 211b illustrated in FIG. 2 to the gate electrode of the transfer transistor 312. The transfer transistor 312 supplies the electric charge photoelectrically converted by the light receiving element 311 to the pixel signal generator 32 in response to the transfer signal TRG.

A control signal OFG is supplied from the second access control circuit 211b to a gate electrode of the OFG transistor 313. The OFG transistor 313 supplies an electric signal generated by the light receiving element 311 to the DVS AFE 314 in response to the control signal OFG. The electric signal supplied to the DVS AFE 314 is a photocurrent including electric charges.

The pixel signal generator 32 includes the reset transistor 321, the amplification transistor 322, the selection transistor 323, and the floating diffusion layer 324. For example, N-type MOS transistors are used as the reset transistor 321, the amplification transistor 322, and the selection transistor 323.

The electric charge photoelectrically converted by the light receiving element 311 is supplied from the light receiver 31 to the pixel signal generator 32 by the transfer transistor 312. The electric charge supplied from the light receiver 31 is accumulated in the floating diffusion layer 324. The floating diffusion layer 324 generates a voltage signal having a voltage value corresponding to the amount of accumulated electric charges. That is, the floating diffusion layer 324 converts electric charge into voltage.

The reset transistor 321 is connected between the power supply line of the power supply voltage VDD and the floating diffusion layer 324. A reset signal RST is supplied from the second access control circuit 211b to a gate electrode of the reset transistor 321. The reset transistor 321 initializes (resets) the amount of electric charges in the floating diffusion layer 324 in response to the reset signal RST.

The amplification transistor 322 is connected in series with the selection transistor 323 between the power supply line of the power supply voltage VDD and the vertical signal line VSL. The amplification transistor 322 amplifies the voltage signal subjected to charge-voltage conversion by the floating diffusion layer 324.

The selection signal SEL is supplied from the second access control circuit 211b to the gate electrode of the selection transistor 323. The selection transistor 323 outputs, in response to the selection signal SEL, the voltage signal amplified by the amplification transistor 322 to the DVS readout circuit 212b (see FIG. 2) via the vertical signal line VSL as the pixel signal SIG.

In the imaging device 100 including the pixel array section 30 in which the DVS pixels 308b having the above-described configuration are two-dimensionally arranged, the second access control circuit 211b supplies the control signal OFG to the OFG transistor 313 of the light receiver 31, thereby driving the OFG transistor 313 to supply photocurrent to the DVS AFE 314, in response to an instruction to start the detection of an address event from the controller 13 illustrated in FIG. 1.

Then, when an address event is detected in a certain DVS pixel 308b, the second access control circuit 211b turns off the OFG transistor 313 of the DVS pixel 308b to stop the supply of photocurrent to the DVS AFE 314. Next, the second access control circuit 211b supplies the transfer signal TRG to the transfer transistor 312, thereby driving the transfer transistor 312 to transfer the electric charge photoelectrically converted by the light receiving element 311 to the floating diffusion layer 324.

In this manner, the imaging device 100 including the pixel array section 30 in which the DVS pixels 308b having the above-described configuration are two-dimensionally arranged outputs only the pixel signal of the DVS pixel 308b in which the address event is detected to the DVS readout circuit 212b. As a result, regardless of whether or not the address event occurs, the power consumption of the imaging device 100 and the processing amount of the image processing can be reduced as compared with the case of outputting the pixel signals of all the pixels.

Note that the configuration of the DVS pixel 308b described here is an example, and the configuration of the DVS pixel 308b is not limited thereto. For example, the DVS pixel 308b may not include the pixel signal generator 32. In this configuration, it is only sufficient that the light receiver 31 does not include the OFG transistor 313 and the transfer transistor 312 has the function of the OFG transistor 313.

First Configuration Example of DVS AFE

Figure 11:
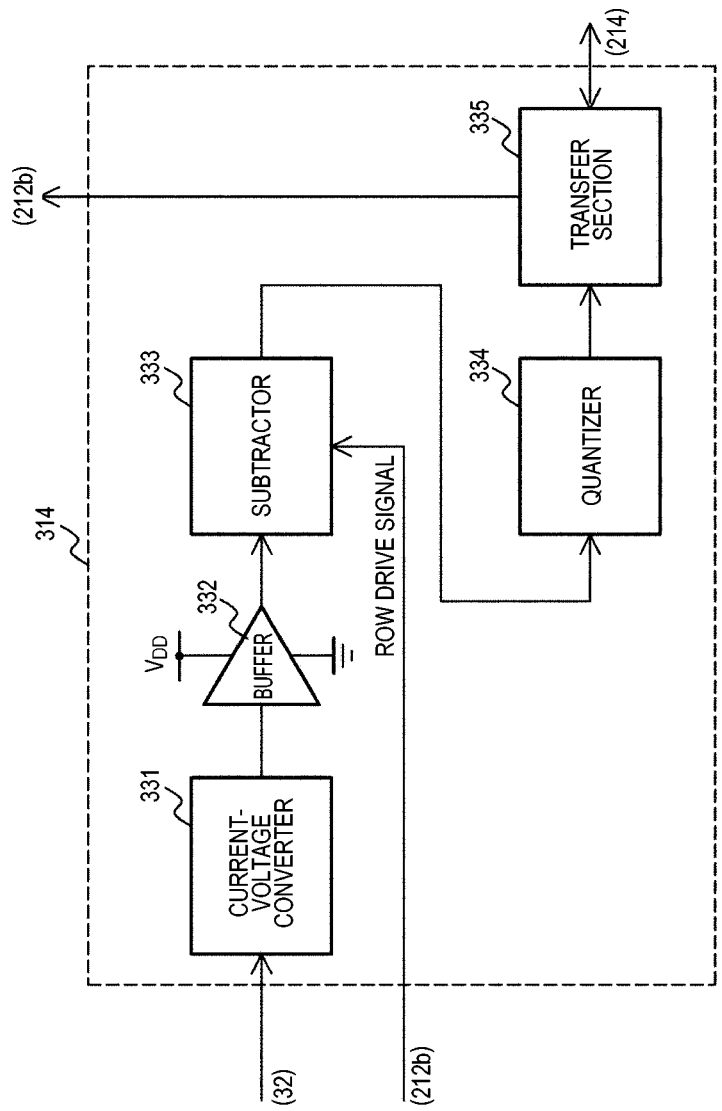
FIG. 11 is a block diagram illustrating a first configuration example of a DVS AFE.

FIG. 11 is a block diagram illustrating a first configuration example of the DVS AFE 314. As illustrated in FIG. 11, the DVS AFE 314 according to the present configuration example includes a current-voltage converter 331, a buffer 332, a subtractor 333, a quantizer 334, and a transfer section 335.

The current-voltage converter 331 converts the photocurrent from the light receiver 31 of the gradation pixel 308a into a logarithmic voltage signal. The current-voltage converter 331 supplies the converted voltage signal to the buffer 332. The buffer 332 buffers the voltage signal supplied from the current-voltage converter 331 and supplies the buffered voltage signal to the subtractor 333.

A row drive signal is supplied from the second access control circuit 211b to the subtractor 333. The subtractor 333 lowers the level of the voltage signal supplied from the buffer 332 in accordance with the row drive signal. Then, the subtractor 333 supplies the voltage signal whose level has been lowered to the quantizer 334. The quantizer 334 quantizes the voltage signal supplied from the subtractor 333 into a digital signal and outputs the digital signal to the transfer section 335 as a detection signal of an address event.

The transfer section 335 transfers the detection signal of the address event supplied from the quantizer 334 to the second signal processor 214 and the like. When an address event is detected, the transfer section 335 supplies a detection signal of the address event to the second signal processor 214 and the second access control circuit 211b.

Next, configuration examples of the current-voltage converter 331, the subtractor 333, and the quantizer 334 in the DVS AFE 314 will be described.

Configuration Example of Current-Voltage Converter

Figure 12:
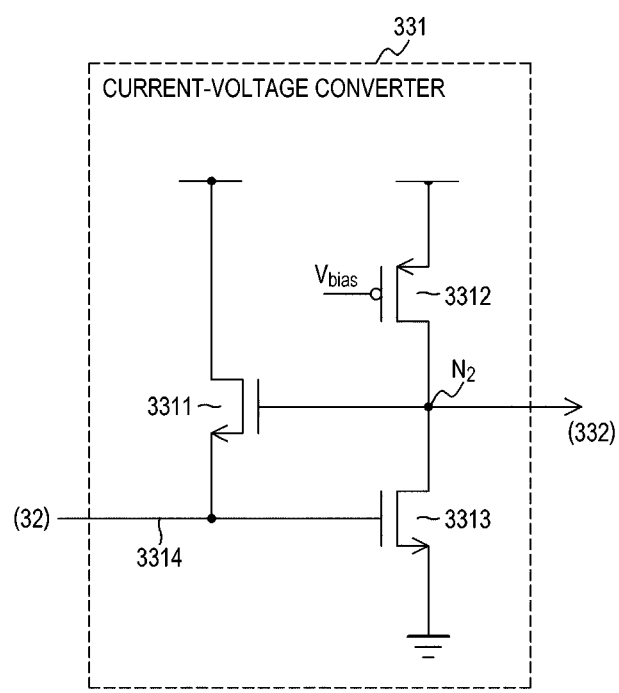
FIG. 12 is a circuit diagram illustrating an example of a configuration of a current-voltage converter.

FIG. 12 is a circuit diagram illustrating an example of a configuration of the current-voltage converter 331 in the DVS AFE 314. As illustrated in FIG. 11, the current-voltage converter 331 according to the present example has a circuit configuration including an N-type transistor 3311, a P-type transistor 3312, and an N-type transistor 3313. For example, MOS transistors are used as these transistors 3311 to 3313.

The N-type transistor 3311 is connected between the power supply line of the power supply voltage VDD and a signal input line 3314. The P-type transistor 3312 and the N-type transistor 3313 are connected in series between the power supply line of the power supply voltage VDD and the ground. In addition, a gate electrode of the N-type transistor 3311 and an input terminal of the buffer 332 illustrated in FIG. 11 are connected to a connection node N2 common to the P-type transistor 3312 and the N-type transistor 3313.

A predetermined bias voltage Vbias is applied to the gate electrode of the P-type transistor 3312. As a result, the P-type transistor 3312 supplies a constant current to the N-type transistor 3313. A photocurrent is input from the light receiver 31 to the gate electrode of the N-type transistor 3313 through the signal input line 3314.

Drain electrodes of the N-type transistor 3311 and the N-type transistor 3313 are connected to a power supply side, and such a circuit is called a source follower. The photocurrent from the light receiver 31 is converted into a logarithmic voltage signal by the two source followers connected in a loop.

Configuration Examples of Subtractor and Quantizer

Figure 13:
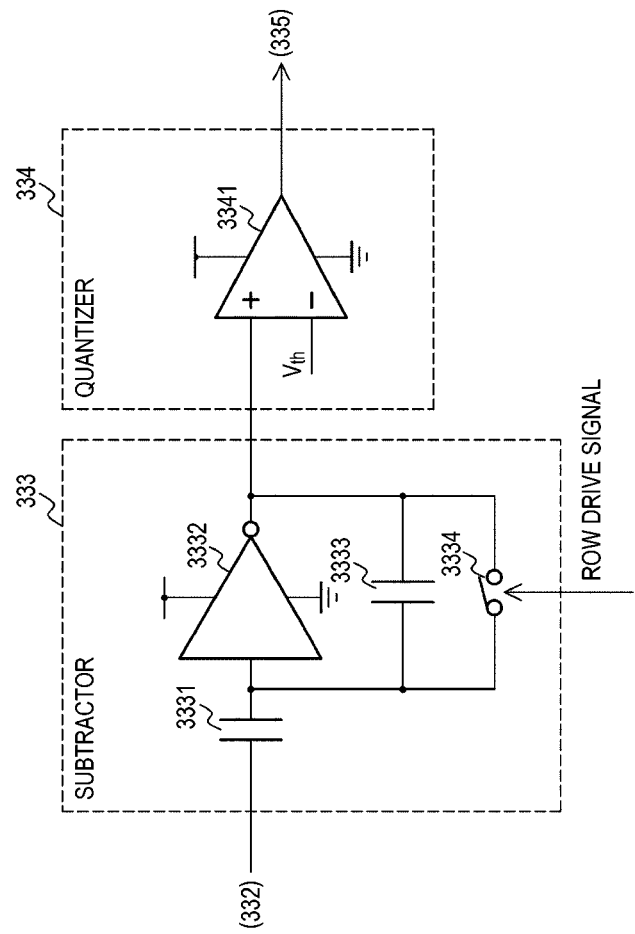
FIG. 13 is a circuit diagram illustrating an example of a configuration of a subtractor and a quantizer.

FIG. 13 is a circuit diagram illustrating an example of configurations of the subtractor 333 and the quantizer 334 in the DVS AFE 314.

The subtractor 333 according to the present example includes a capacitive element 3331, an inverter circuit 3332, a capacitive element 3333, and a switch element 3334.

One end of the capacitive element 3331 is connected to an output terminal of the buffer 332 illustrated in FIG. 11, and the other end thereof is connected to an input terminal of the inverter circuit 3332. The capacitive element 3333 is connected in parallel to the inverter circuit 3332. The switch element 3334 is connected between both ends of the capacitive element 3333. The row drive signal is supplied from the second access control circuit 211b to the switch element 3334 as an on/off control signal. The switch element 3334 turns on or off a path connecting both ends of the capacitive element 3333 according to the row drive signal. The inverter circuit 3332 inverts the polarity of the voltage signal input via the capacitive element 3331.

In the subtractor 333 having the above configuration, when the switch element 3334 is turned on (closed), the voltage signal Vinit is input to the terminal of the capacitive element 3331 on the buffer 332 side, and the terminal on the opposite side serves as a virtual ground terminal. The potential of the virtual ground terminal is set to zero for convenience. At this time, when the capacitance value of the capacitive element 3331 is C1, electric charge Qinit accumulated in the capacitive element 3331 is expressed by the following Expression (1). On the other hand, since both ends of the capacitive element 3333 are short-circuited, the capacitive element 3333 has no accumulated electric charges.

$$Q_{init} = C1 \times V_{init} \tag{1}$$

Next, considering a case where the switch element 3334 is turned off (open) and the voltage of the terminal of the capacitive element 3331 on the buffer 332 side changes to Vafter, electric charge Qafter accumulated in the capacitive element 3331 is expressed by the following Expression (2).

$$Q_{after} = C1 \times V_{after} \tag{2}$$

On the other hand, when the capacitance value of the capacitive element 3333 is C2 and the output voltage is Vout, the electric charge Q2 accumulated in the capacitive element 3333 is expressed by the following Expression (3).

$$Q2 = -C2 \times V_{out} \tag{3}$$

At this time, since the total electric charge amount of the capacitive element 3331 and the capacitive element 3333 does not change, the following Expression (4) is established.

$$Q_{init} = Q_{after} + Q2 \tag{4}$$

When Expressions (1) to (3) are substituted into Expression (4) and rearranged, the following Expression (5) is obtained.

$$V_{out} = -(C1/C2) \times (V_{after} - V_{init}) \tag{5}$$

Expression (5) represents a subtraction operation of the voltage signal, and the gain of the subtraction result is C1/C2. It is commonly desired to maximize the gain, and thus, it is preferable to design C1 to be larger and C2 to be smaller. On the other hand, when C2 is too small, kTC noise increases, and noise characteristics may deteriorate. Therefore, the decrease in capacitance C2 is limited to a range in which noise can be tolerated. Furthermore, since the DVS AFE 314 including the subtractor 333 is mounted for each DVS pixel 308b, the capacitive element 3331 and the capacitive element 3333 have restrictions in terms of area. The capacitance values C1 and C2 of the capacitive elements 3331 and 3333 are determined in consideration of these factors.

In FIG. 13, the quantizer 334 includes a comparator 3341. The comparator 3341 uses the output signal of the inverter circuit 3332, that is, the voltage signal from the subtractor 333 as a non-inverting (+) input, and uses a predetermined threshold voltage Vth as an inverting (−) input. Then, the comparator 3341 compares the voltage signal from the subtractor 333 with the predetermined threshold voltage Vth, and outputs a signal indicating a comparison result to the transfer section 335 as the detection signal of an address event.

Second Configuration Example of DVS AFE

Figure 14:
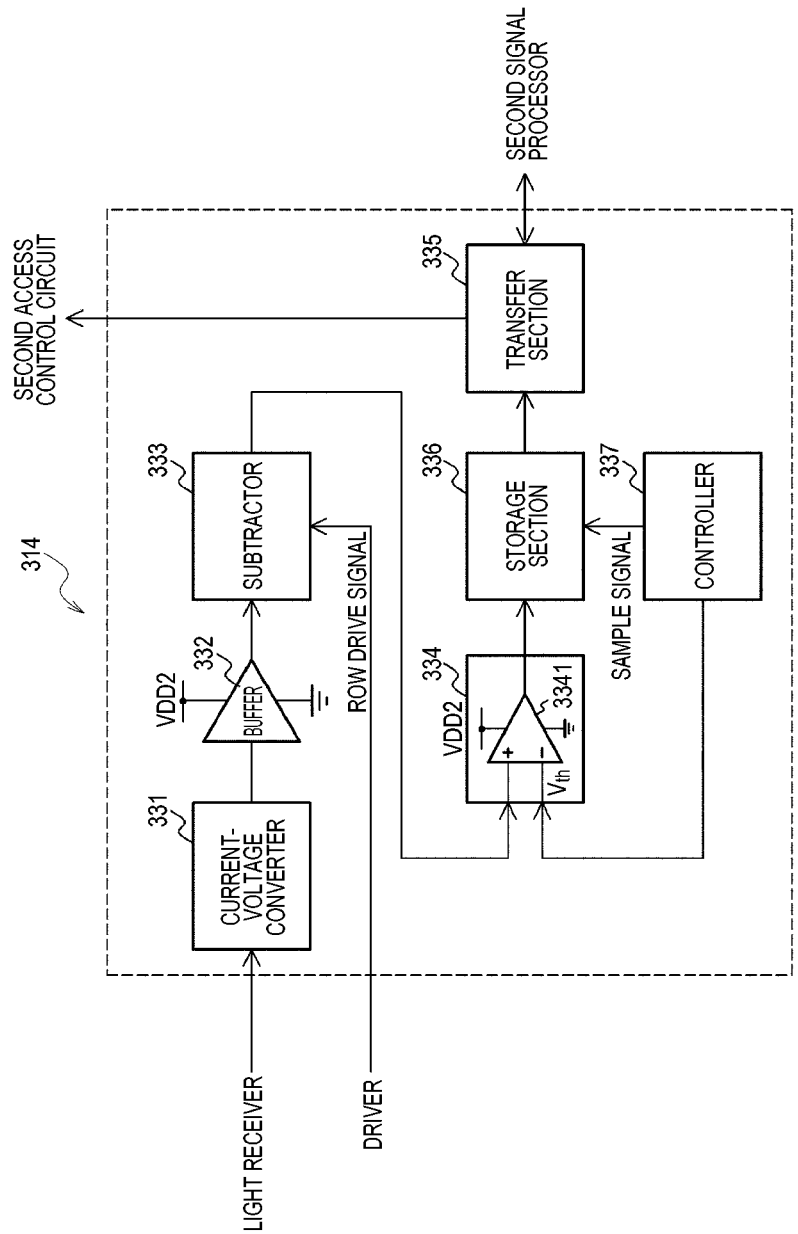
FIG. 14 is a block diagram illustrating a second configuration example of a DVS AFE.

FIG. 14 is a block diagram illustrating a second configuration example of the DVS AFE 14. As illustrated in FIG. 14, the DVS AFE 314 according to the present configuration example includes a storage section 336 and a controller 337 in addition to the current-voltage converter 331, the buffer 332, the subtractor 333, the quantizer 334, and the transfer section 335.

The storage section 336 is provided between the quantizer 334 and the transfer section 335, and accumulates the output of the quantizer 334, that is, the comparison result of the comparator 3341 on the basis of a sample signal supplied from the controller 337. The storage section 336 may be a sampling circuit such as a switch, plastic, or a capacitor, or may be a digital memory circuit such as a latch or a flip-flop.

The controller 337 supplies a predetermined threshold voltage Vth to the inverting (−) input terminal of the comparator 3341. The threshold voltage Vth supplied from the controller 337 to the comparator 3341 may have different voltage values in a time division manner. For example, the controller 337 supplies the threshold voltage Vth1 corresponding to the on-event indicating that the an amount of change of the photocurrent exceeds the upper limit threshold value and the threshold voltage Vth2 corresponding to the off-event indicating that the an amount of change thereof falls below the lower limit threshold value at different timings, so that one comparator 3341 can detect a plurality of types of address events.

For example, the storage section 336 may accumulate the comparison result of the comparator 3341 using the threshold voltage Vth1 corresponding to the on-event during a period in which the threshold voltage Vth2 corresponding to the off-event is supplied from the controller 337 to the inverting (−) input terminal of the comparator 3341. Note that the storage section 336 may be inside the DVS pixel 308b or outside the DVS pixel 308b. In addition, the storage section 336 is not a necessary component of the DVS AFE 314. That is, the storage section 336 may not be provided.

Configuration Example of Dummy DVS Pixel

Figure 15:
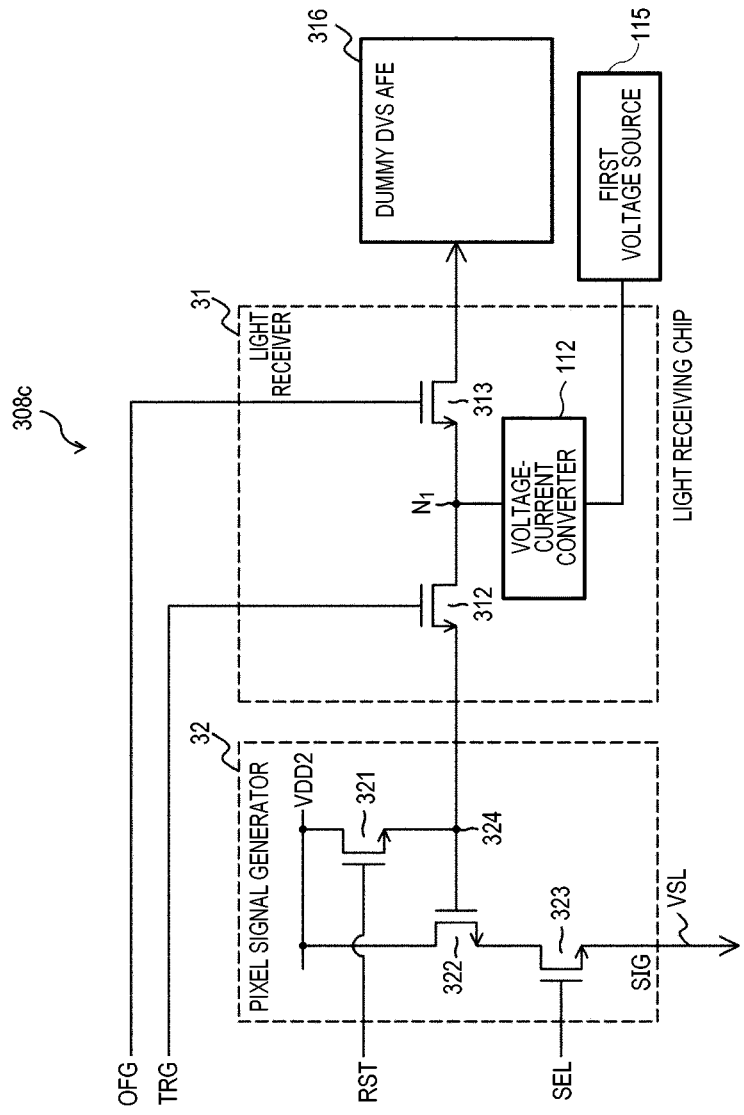
FIG. 15 is a diagram illustrating a configuration example of a dummy DVS pixel.

Here, the detailed configuration example of the dummy DVS pixel 308c and the dummy DVS AFE 316 will be described with reference to FIG. 15. FIG. 15 is a diagram illustrating a configuration example of the dummy DVS pixel 308c. As illustrated in FIG. 15, the dummy DVS pixel 308c includes a voltage-current converter 112. The voltage-current converter 112 is, for example, an operational amplifier, and has one end connected to the node N1 and the other end connected to a first voltage source 115. The voltage-current converter 112 converts the voltage supplied from the first voltage source 115 into a current, and supplies the current to the dummy DVS AFE 316 via the OFG transistor 313. As a result, the dummy DVS pixel 308c can directly supply a current corresponding to the control signal to the dummy DVS AFE 316 using the voltage supplied from the first voltage source 1150 as the control signal.

The dummy DVS AFE 316 has a configuration equal to the configuration of the DVS AFE 314, and is different from the DVS AFE 314 in detecting an address event by a current supplied supplied from the dummy DVS pixel 308c. With such a configuration, the dummy DVS AFE 316 can perform driving similar to that of the DVS AFE 314 by the voltage supplied from the first voltage source 1150.

Figure 16:
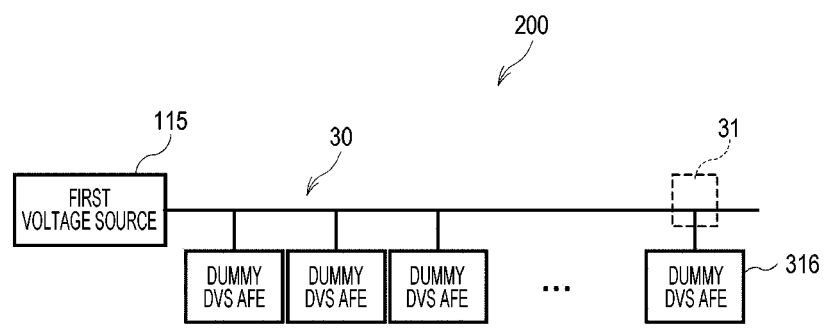
FIG. 16 is a diagram illustrating a configuration example of a dummy DVS AFE connected to a first voltage source.

FIG. 16 is a diagram illustrating a configuration example of the dummy DVS AFE 316 connected to the first voltage source 1150. As illustrated, each dummy DVS AFE 316 is connected to the first voltage source 115. Thus, by supplying a voltage from the first voltage source 115 to each dummy DVS AFE 316, each dummy DVS AFE 316 performs driving similar to the driving of the DVS AFE 314. As a result, a decrease in the power supply voltage VDD2 caused by driving the DVS AFE 314 can be reproduced by each dummy DVS AFE 316. Note that FIG. 16 does not illustrate the components other than the solid-state imaging element 200.

Here, an imaging control example of the solid-state imaging element 200 will be described with reference to FIGS. 17A, 17B, and 17C.

Figure 17:
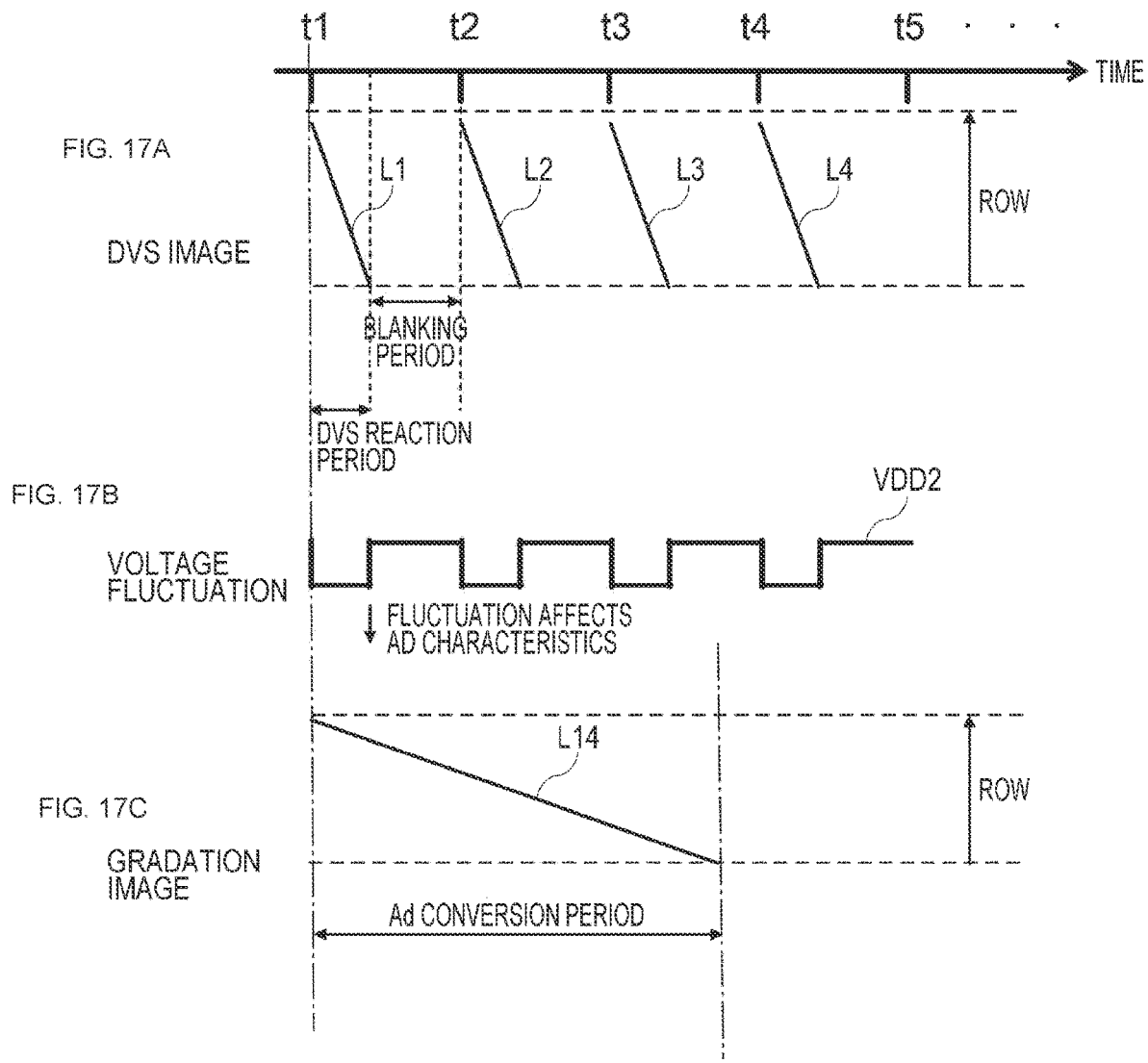
FIGS. 17A, 17B, and 17C are diagrams illustrating an imaging control example by a timing control circuit.

FIGS. 17A, 17B, and 17C are diagrams illustrating an imaging control example by the timing control circuit 216. The horizontal axis represents time. Furthermore, times t1 to t5 indicate read start times t1 to t5 of respective frames f1 to f5 of DVS pixel data. Here, an example of timing control by the timing control circuit 216 in a case where the plurality of dummy DVS pixels 308c and the plurality of dummy DVS AFEs 316 are stopped will be described.

FIG. 17A is a schematic diagram illustrating read start times of pixel rows in the respective frames f1 to f5 of the DVS pixel data. The vertical axis corresponds to the pixel row of the pixel array section 30 (see FIG. 3). A line L1 indicates a read start time of a pixel row in the first DVS image and the second DVS image. That is, the second access control circuit 211b causes the DVS AFE 314 in the corresponding row to detect an address event according to the time indicated by the line L1 in accordance with the timing control by the timing control circuit 216. When detecting an address event, the DVS AFE 314 in each row outputs a signal including event information to the second signal processor 214. The second signal processor 214 uses the detection signal of the DVS pixel 308b having the address event as an image signal, and generates a first DVS image in which the image signal is sequentially changed. The first DVS image is, for example, a ternary image. Note that a blanking period according to the present embodiment corresponds to a vertical blanking period of the DVS pixel 308b.

When detecting an address event, the DVS AFE 314 in each row also outputs a signal including address information to the second access control circuit 211b. As a result, the second access control circuit 211b converts the DVS luminance signal from the DVS pixel 308b having the address event into a digital signal via the DVS readout circuit 212b, and sequentially outputs the digital signal to the second signal processor 214. The second signal processor 214 generates a second DVS image in which the image signal of the DVS pixel 308b having the address event is sequentially changed.

Similarly, lines L2 to L4 indicate read start times of the pixel rows of frames f2 to f4. Note that, in the present embodiment, one piece of image data read from the pixel array section 30 is referred to as a frame.

FIG. 17B illustrates an example of fluctuation in the power supply voltage VDD2 for driving the plurality of DVS pixels 308b and the plurality of DVS AFEs 314. The vertical axis represents voltage. The power supply voltage VDD2 decreases in a period (DVS reaction period) in which the detection of the DVS AFE 314 is performed. On the other hand, in the blanking period in which the detection of the DVS AFE 314 is not performed, the voltage increases. In this manner, the power supply voltage VDD2 fluctuates in conjunction with the driving timings of the plurality of DVS pixels 308b and the plurality of DVS AFEs 314.

FIG. 17C illustrates a read start time L14 of each pixel row of the plurality of gradation pixels 308a. That is, the first access control circuit 211a reads the gradation luminance signal from the gradation pixel 308a for each pixel row according to the time indicated by the line L14 in accordance with the timing control by the timing control circuit 216. An Ad conversion period during which each pixel row is read corresponds to a period during which the AD converter 212a performs Ad conversion. The AD converter 212a sequentially converts the gradation luminance signal into a digital signal and supplies the digital signal to the first signal processor 213. When the gradation luminance signals of all the gradation pixels 308a are supplied as digital signals, the first signal processor 213 generates a gradation image and performs predetermined signal processing.

The voltage fluctuation illustrated in FIG. 17B may be coupled to the AD converter 212a and cause deterioration in image quality such as generation of linear noise in the gradation image.

An example of imaging control by the timing control circuit 216 in a case where each dummy DVS AFE 316 is driven will be described with reference to FIGS. 18A, 18B, and 18C.

Figure 18:
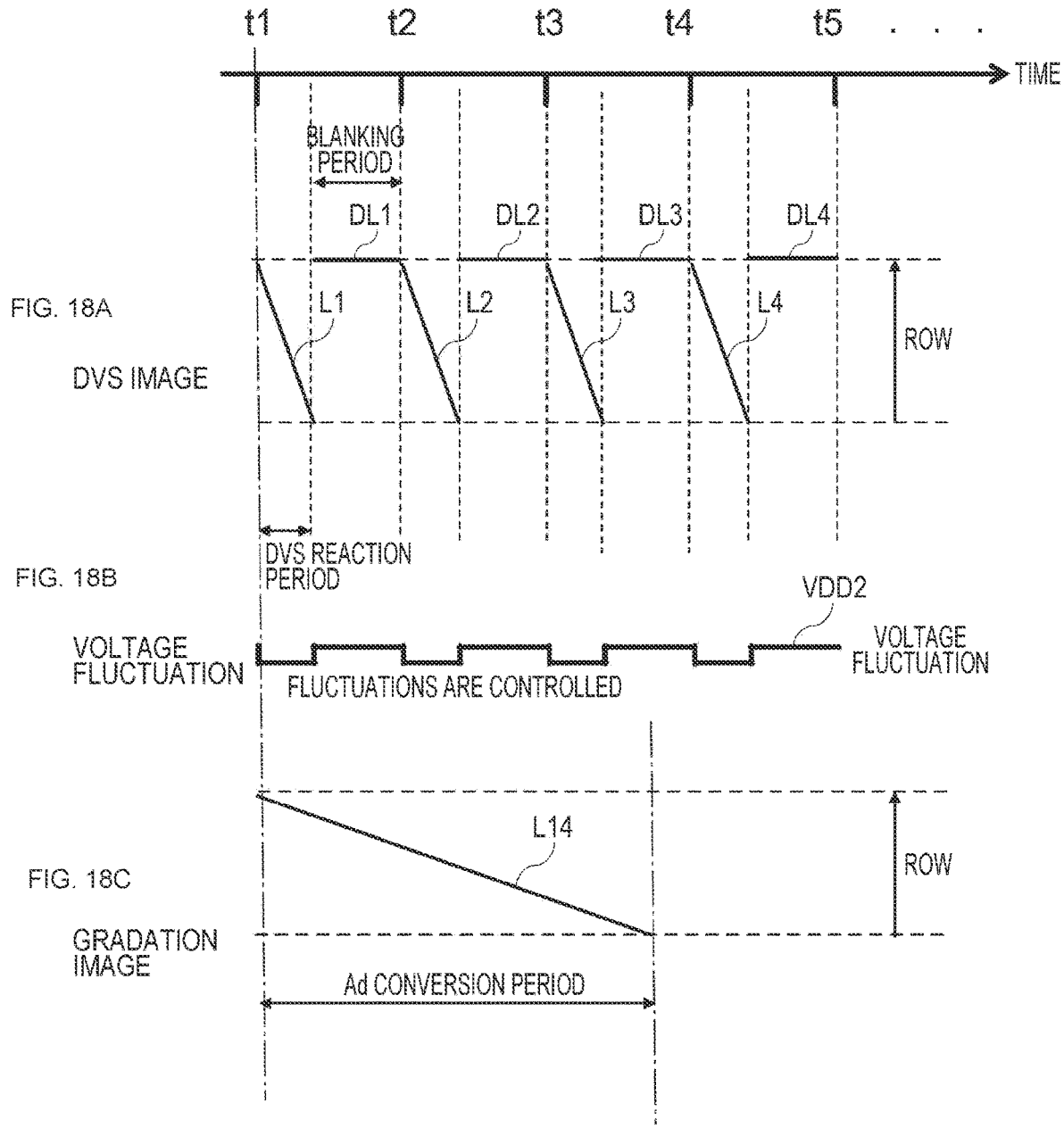
FIGS. 18A, 18B, and 18C are diagrams illustrating an imaging control example in a case where each dummy DVS AFE is driven.

FIGS. 18A, 18B, and 18C are diagrams illustrating an imaging control example in a case where each dummy DVS AFE 316 is driven by the timing control circuit 216. The horizontal axis represents time as in FIGS. 17A, 17B, and 17C. Furthermore, times t1 to t5 indicate read start times t1 to t5 of respective frames f1 to f5 of DVS pixel data.

FIG. 18A is a schematic diagram illustrating lines L1 to L5 indicating read start times of pixel rows and lines DL1 to DL4 indicating periods in which the respective dummy DVS AFEs 316 are driven in the respective frames f1 to f5 of the DVS pixel data. The vertical axis corresponds to the pixel row of the pixel array section 30 (see FIG. 3). The line DL1 indicates a period during which each dummy DVS AFE 316 is driven in a blanking period between the line L1 and the line L2. Similarly, each of the lines DL2 to DL4 indicates a period during which the dummy DVS AFE 316 is driven in the corresponding blanking period. As described above, since each dummy DVS AFE 316 can be driven similarly to the DVS AFE 314, the rise of the power supply voltage VDD2 can be reduced as in the case where each DVS AFE 314 is driven.

FIG. 18B illustrates an example of fluctuation of the power supply voltage VDD2. The vertical axis represents voltage. As compared with FIGS. 17A, 17B, and 17C, the voltage rise during the blanking period is suppressed by driving each dummy DVS AFE 316. As a result, it is possible to suppress deterioration in image quality of the gradation image caused by, for example, coupling with the power supply voltage VDD2. Particularly, it is possible to suppress deterioration in image quality such as generation of linear noise.

FIG. 18C is a diagram similar to (c) of FIG. 17C.

Figure 19:
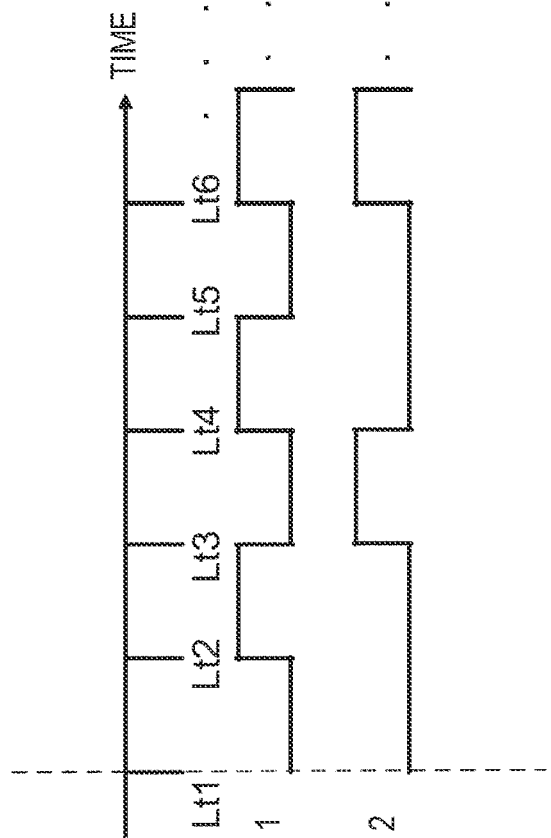
FIGS. 19A and 19B are diagrams illustrating a processing example in which the processing illustrated in FIGS. 17A, 17B, and 17C are performed for three cycles.

FIGS. 19A and 19B are diagrams illustrating a voltage supply pattern of the first voltage source 115 during the blanking period in FIG. 18A. The horizontal axis represents time. Row unit synchronization signals Lt1 to Lt6 correspond to row unit synchronization signals when the first DVS image and the second DVS image are acquired. The second access control circuit 211b controls the first voltage source 115 in synchronization with the row unit synchronization signal.

In a power supply voltage pattern 1, the vertical axis represents voltage. This voltage is set to a value detected as an address event by the dummy DVS AFE 316. Therefore, each dummy DVS AFE 316 detects that an address event occurs when the first voltage source 115 is at a high potential. Thus, the dummy DVS pixel corresponding to each dummy DVS AFE 316 drives the pixel signal generator 32 (see FIG. 15). Therefore, during a period in which the first voltage source 115 has a high potential, the power consumption of the pixel signal generator 32 increases, and the power supply voltage VDD2 decreases.

In a power supply voltage pattern 2, the vertical axis represents voltage. This voltage is set to a value detected as an address event by the dummy DVS AFE 316. A period during which the first voltage source 115 is at a high potential is ⅔ the period in the power supply voltage pattern 1. Therefore, the period during which the pixel signal generator 32 (see FIG. 15) is driven is ⅔ the period in the power supply voltage pattern 1. As a result, the decrease in the power supply voltage VDD2 is smaller than that in the power supply voltage pattern 1 on average during the blanking period. As described above, a decrease in the power supply voltage VDD2 during the blanking period can be controlled by changing the power supply voltage pattern.

As described above, according to the present embodiment, the dummy DVS pixel 308c and the dummy DVS AFE 314 having configurations equal to the configurations of the DVS pixel 308b and the DVS AFE 316 that capture the first DVS image and the second DVS image are driven during the blanking period in which the first DVS image and the second DVS image are not captured. With this configuration, a voltage drop similar to the voltage drop of the power supply voltage VDD2 occurring during an imaging period of the first DVS image and the second DVS image can be generated during the blanking period, and thus, fluctuations in the power supply voltage VDD2 caused by the imaging period of the first DVS image and the second DVS image and the blanking period can be suppressed. Therefore, it is possible to suppress the occurrence of coupling noise and the like generated in the captured image due to fluctuations in the power supply voltage VDD2.

First Modification of First Embodiment

An imaging device 100 according to the first modification of the first embodiment is different from the imaging device 100 according to the first embodiment in that the power consumption is controlled by the dummy DVS pixel 308c and the dummy DVS AFE 316 by controlling the potential difference between the first voltage source 115 and a second voltage source 117. The differences from the imaging device 100 according to the first embodiment will be described below.

Figure 20:
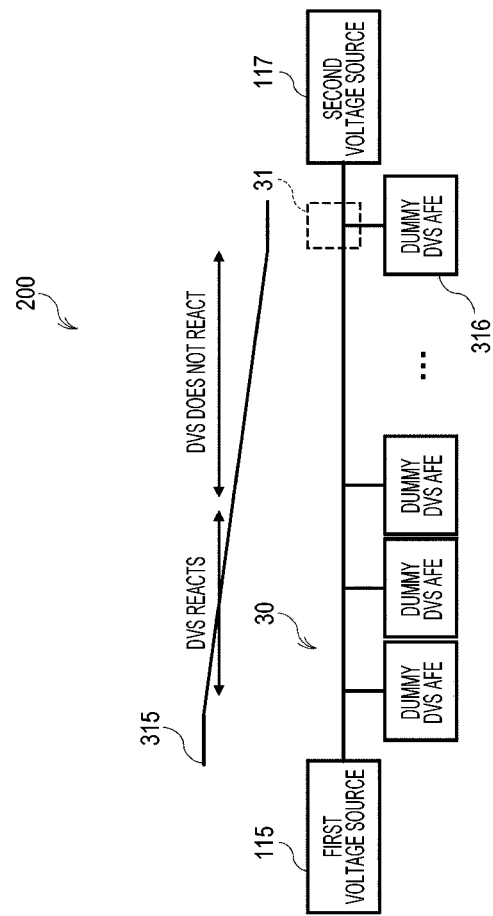
FIG. 20 is a diagram schematically illustrating a control example of the dummy DVS AFE.

FIG. 20 is a diagram schematically illustrating a control example of the dummy DVS AFE 316 according to the first modification of the first embodiment. As illustrated in FIG. 20, the first voltage source 115 and the second voltage source 117 are disposed at both ends of the pixel array section 30 (see FIG. 3). As illustrated, the voltage-current conversion sections 112 (see FIG. 15) are connected between the first voltage source 115 and the second voltage source 117 via the dummy DVS pixels 308c. Therefore, a voltage 315 applied to each voltage-current conversion section 112 is changed by the potential difference between the first voltage source 115 and the second voltage source 117. The potential of the first voltage source 115 is set to a potential that causes the dummy DVS AFE 316 to detect occurrence of an address event. On the other hand, the potential of the second voltage source 117 is set to a potential that does not cause the dummy DVS AFE 316 to detect occurrence of an address event. Note that FIG. 20 does not illustrate the components other than the solid-state imaging element 200.

With this configuration, it is possible to perform control such that, for example, the dummy DVS AFE 316 connected to the first voltage source 115 side detects the occurrence of an address event and the dummy DVS AFE 316 connected to the second voltage source 117 side does not detect the occurrence of an address event. The number of dummy DVS AFEs 316 that detect the occurrence of an address event can be controlled by controlling the potentials of the first voltage source 115 and the second voltage source 117 as described above. That is, the number of pixel signal generators 32 (see FIG. 15) to be driven is controlled by controlling the potentials of the first voltage source 115 and the second voltage source 117. As can be seen from the above, the decrease of the power supply voltage VDD2 during the blanking period can be controlled by controlling the potentials of the first voltage source 115 and the second voltage source 117.

Second Modification of First Embodiment

An imaging device 100 according to the second modification of the first embodiment is different from the imaging device 100 according to the first embodiment in enabling control to drive the dummy DVS pixel 308c and the dummy DVS AFE 316 also during a horizontal blanking period. The differences from the imaging device 100 according to the first embodiment will be described below.

Figure 21:
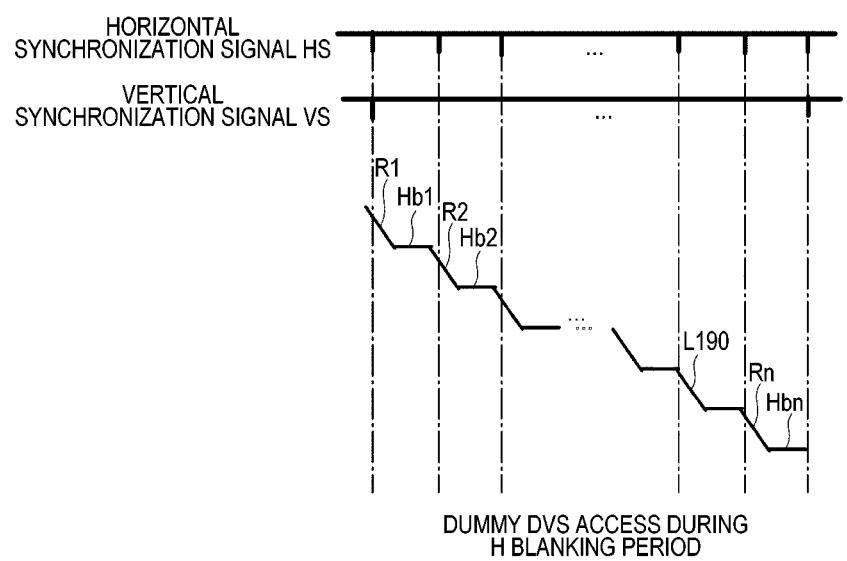
FIG. 21 is a diagram schematically illustrating a control example of a dummy DVS pixel and a dummy DVS AFE according to a second modification of the first embodiment.

FIG. 21 is a diagram schematically illustrating a control example of the dummy DVS pixel 308c and the dummy DVS AFE 316 according to the second modification of the first embodiment. The horizontal axis represents time. A line L190 indicates periods R1 to Rn in which the DVS pixels 308b and the DVS AFEs 314 corresponding to each row of the pixel array section 30 are driven in synchronization with a horizontal synchronization signal HS, and H blanking periods Hb1 to Hbn in which the dummy DVS pixel 308c and the dummy DVS AFE 316 are driven. That is, the H blanking periods Hb1 to Hbn correspond to the horizontal blanking periods of the plurality of DVS pixels 308c.

As illustrated in FIG. 21, the first voltage source 115 is set to a potential at which occurrence of an address event is detected during the H blanking periods Hb1 to Hbn. Accordingly, power consumption similar to that during the periods R1 to Rn can be controlled by driving the dummy DVS pixel 308c and the dummy DVS AFE 316 during the H blanking periods Hb1 to Hbn. Therefore, fluctuations in the power supply voltage VDD2 in a short cycle during the H blanking periods Hb1 to Hbn corresponding to the periods R1 to Rn are suppressed.

Third Modification of First Embodiment

An imaging device 100 according to the third modification of the first embodiment is different from the imaging device 100 according to the first embodiment in generating only a first DVS image. The differences from the imaging device 100 according to the first embodiment will be described below.

Figure 22:
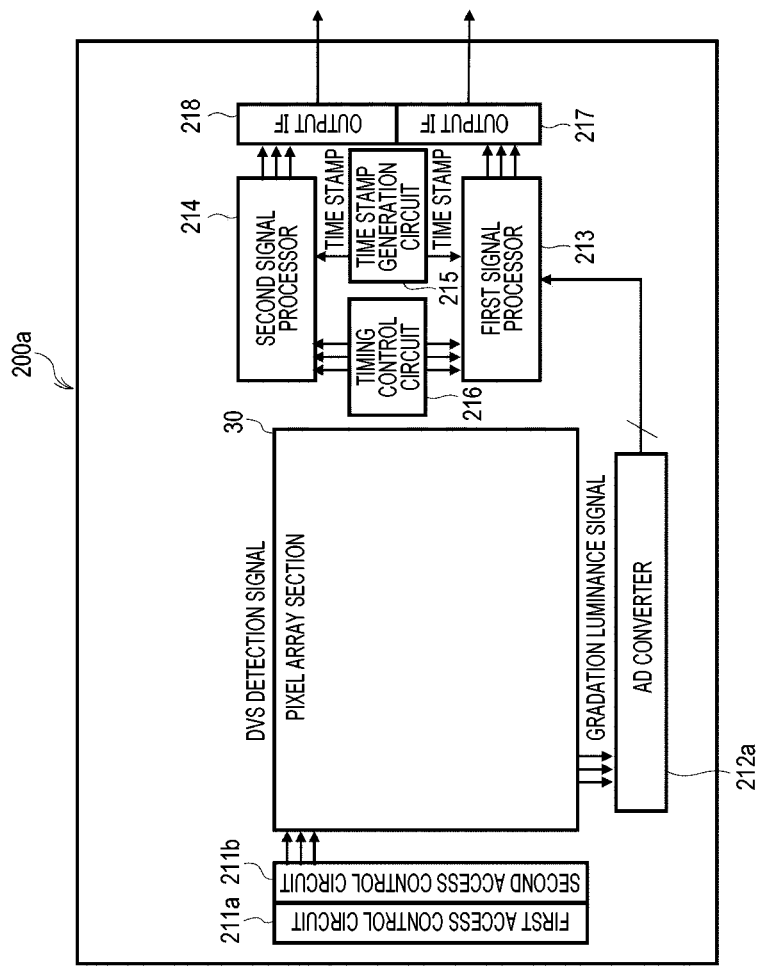
FIG. 22 is a block diagram illustrating a configuration example of a solid-state imaging element according to a third modification of the first embodiment.

FIG. 22 is a block diagram illustrating a configuration example of a solid-state imaging element 200a according to the third modification of the first embodiment. As illustrated in FIG. 22, the solid-state imaging element 200a according to the present disclosure is different from the solid-state imaging element 200 according to the first embodiment in not including a DVS readout circuit 212b.

Figure 23:
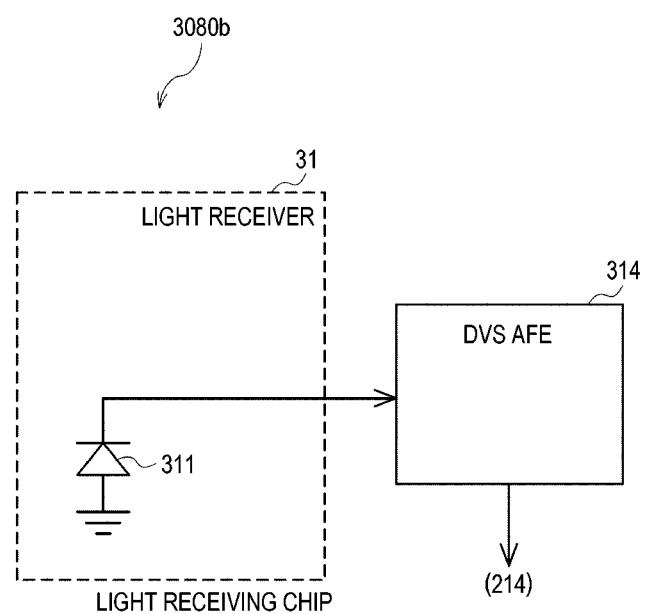
FIG. 23 is a diagram illustrating a configuration example of a DVS pixel according to the third modification of the first embodiment.

FIG. 23 is a diagram illustrating a configuration example of a DVS pixel 308b according to the third modification of the first embodiment. As illustrated in FIG. 23, the DVS pixel 3080b according to the third modification of the first embodiment includes a light receiving element 311. On the other hand, the DVS pixel 3080b is different from the DVS pixel 308b according to the first embodiment in not including the pixel signal generator 32 (see FIG. 10).

Figure 24:
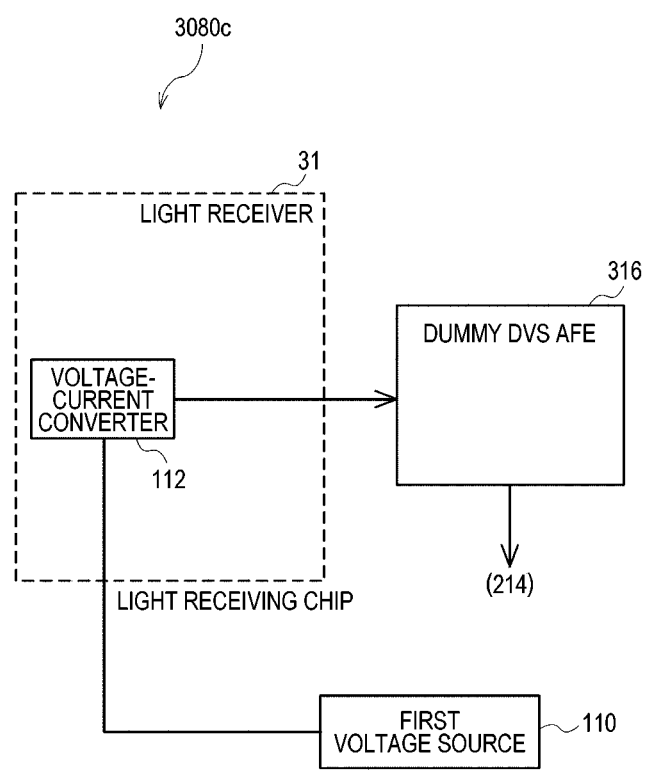
FIG. 24 is a diagram illustrating a configuration example of a dummy DVS pixel according to a second embodiment.

FIG. 24 is a diagram illustrating a configuration example of a dummy DVS pixel 3080c according to the third modification of the first embodiment. As illustrated in FIG. 24, the dummy DVS pixel 3080c includes a voltage-current converter 112. The DVS pixel 3080c does not include the pixel signal generator 32 (see FIG. 15), and thus, fluctuations in the power supply voltage VDD2 due to driving of the pixel signal generator 32 (see FIG. 15) does not occur. Therefore, it is possible to further reduce a period (see FIGS. 19A and 19B) during which the first voltage source 115 is at a high potential. Thus, it is possible to suppress fluctuations in the power supply voltage VDD2 while further suppressing power consumption of the imaging device 100.

Second Embodiment

An imaging device 100 according to the second embodiment is different from the imaging device 100 according to the first embodiment in that the voltage generation pattern of the first voltage source 115 is changed according to the number of occurrences of address events. The differences from the imaging device 100 according to the first embodiment will be described below.

Figure 25:
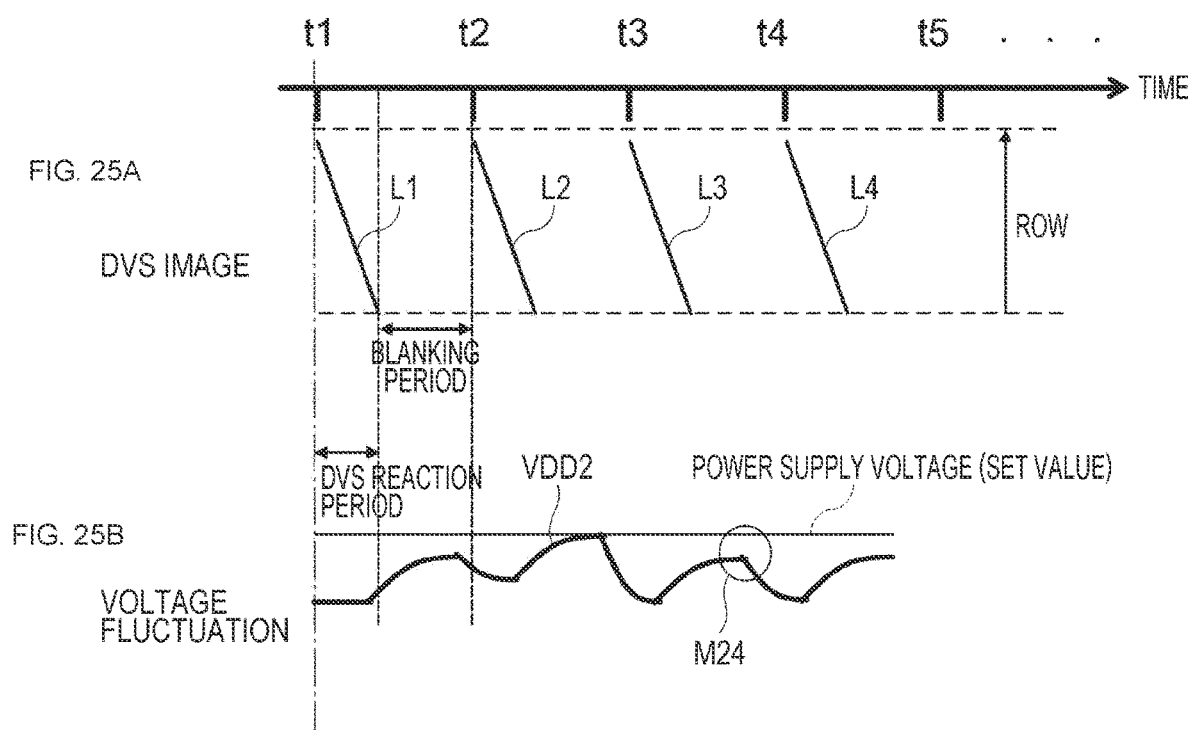
FIGS. 25A and 25B are diagrams illustrating an example of fluctuations in a power supply voltage in a case where the dummy DVS pixel and a dummy DVS AFE are uniformly driven during a blanking period.

FIGS. 25A and 25B are diagrams illustrating a fluctuation example of the power supply voltage VDD2 in a case where the dummy DVS pixel 308c and the dummy DVS AFE 316 are uniformly driven during the blanking period. The horizontal axis represents time as in FIGS. 18A, 18B, and 18C. Furthermore, times t1 to t5 indicate read start times t1 to t5 of respective frames f1 to f5 of DVS pixel data. As illustrated in FIGS. 25A and 25B, the maximum value of the power supply voltage VDD2 may periodically fluctuate in a case where the activation rate is high. For example, in a case where an imaging scene is greatly changed, the maximum value of the power supply voltage VDD2 may periodically fluctuate. The maximum voltage of a mark M24 does not reach the voltage set value. This is considered to occur because, in a case where the activation rate is high, the driving rate of the pixel signal generator 32 (see FIG. 10) increases, and the restoration to the set voltage value of the power supply voltage VDD2 cannot be achieved in time. Note that, in the present embodiment, a ratio obtained by dividing the number of address events detected by each of the DVS AFEs 314 by the number of all the DVS AFEs 314 is referred to as an activation rate. As described above, when the activation rate is high, the decrease in the power supply voltage VDD2 becomes large, and the voltage may not reach the voltage set value. In such a case, the threshold value of the DVS AFE 314 (see FIG. 14) changes, and the number of DVS reactions is excessive (or too small).

Figure 26:
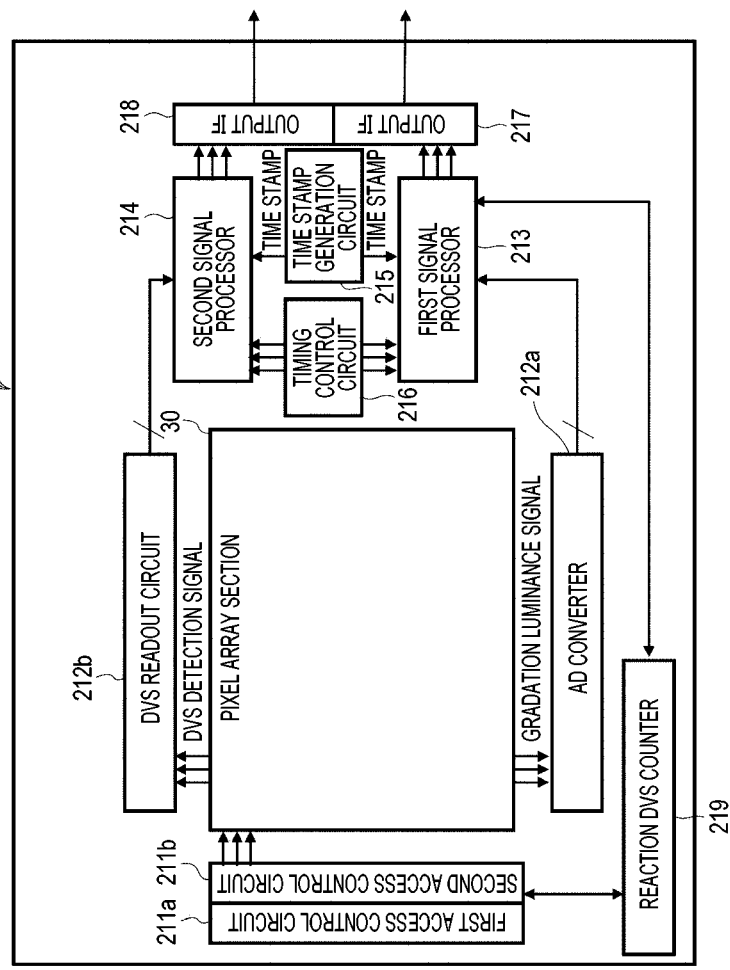
FIG. 26 is a diagram illustrating a configuration example of an imaging element according to the second embodiment.

FIG. 26 is a diagram illustrating a configuration example of the solid-state imaging element 200 according to the second embodiment. As illustrated in FIG. 26, the solid-state imaging element 200 according to the second embodiment further includes a DVS counter 219.

The DVS counter 219 counts the number of address events detected by each DVS AFE 314, and outputs the control voltage of the first voltage source 115 to the second access control circuit 211*b*. More specifically, the DVS counter 219 decreases the number of times the first voltage source 115 is at a high potential (see FIGS. 19A and 19B), as the number of counted address events increases. With this configuration, as the count of the number of address events increases, the power consumed by the dummy DVS pixel 308*c* and the dummy DVS AFE 316 is reduced, and the power supply voltage VDD2 can stably reach the voltage set value. As described above, as the activation rate of the DVS pixel 308*b* (see FIG. 3) increases, the number of times the first voltage source 115 is at a high potential is reduced, and the decrease in the power supply voltage VDD2 during the blanking period is suppressed, so that the power supply voltage VDD2 can stably reach the voltage set value.

The fluctuation in the power supply voltage VDD2 in a time period in which several rows from the last row of the pixel array section 30 are read most affects the fluctuation in the power supply voltage VDD2 during the blanking period. Therefore, the DVS counter 21 may change the pulsed voltage pattern according to the number of address events detected by each DVS AFE 314 in the several rows from the last row of the pixel array section 30 in terms of the reading order.

Example of Application of Technology According to Present Disclosure

The technology according to the present disclosure can be applied to various products. More specific examples of application will be described below. For example, the technology according to the present disclosure may be implemented as a ranging device to be mounted on any type of mobile objects such as vehicles, electric vehicles, hybrid electric vehicles, motorcycles, bicycles, personal mobilities, airplanes, drones, ships, robots, construction machines, and agricultural machines (tractors).

[Mobile Object]

Figure 27:
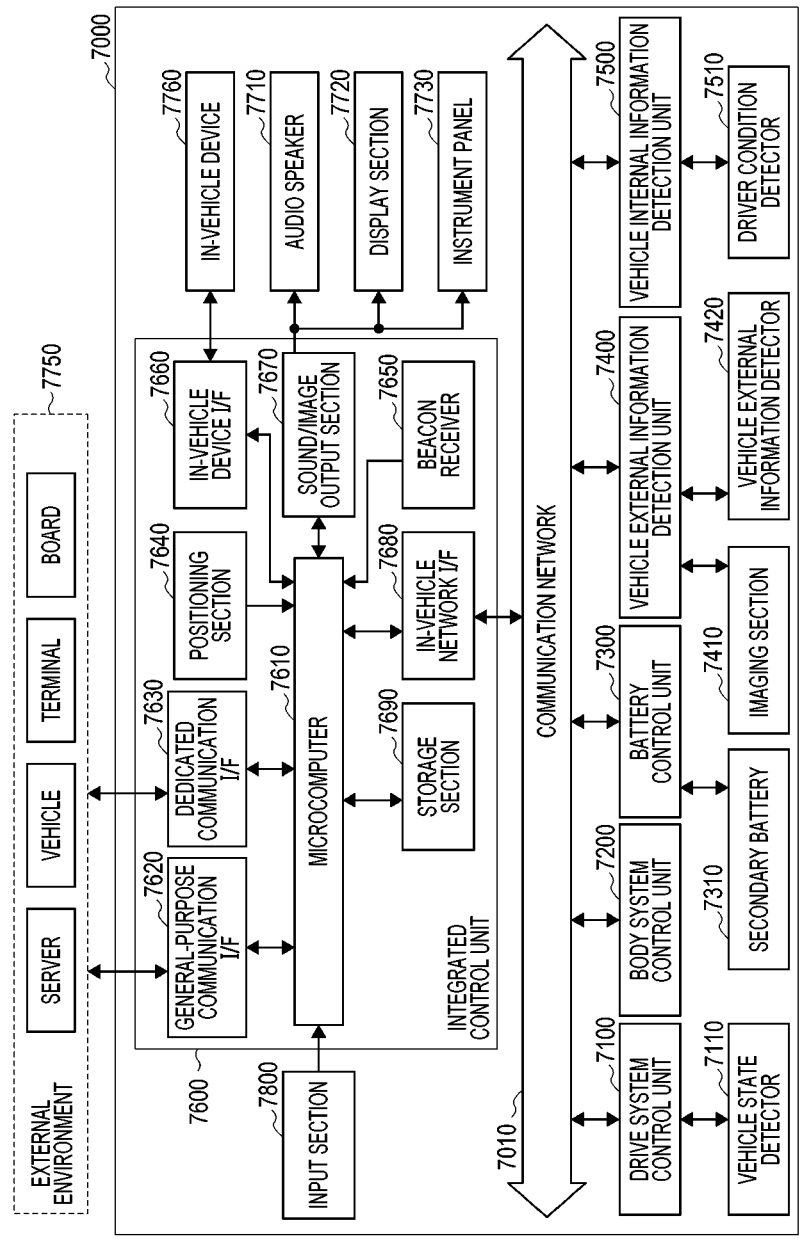
FIG. 27 is a block diagram illustrating a schematic configuration example of a vehicle control system which is an example of a mobile object control system to which the technology according to the present disclosure can be applied.

FIG. 27 is a block diagram showing a schematic configuration example of a vehicle control system 7000 which is an example of a mobile object control system to which the technology according to the present disclosure can be applied. The vehicle control system 7000 includes a plurality of electronic control units connected to each other via a communication network 7010. In the example shown in FIG. 26, the vehicle control system 7000 includes a drive system control unit 7100, a body system control unit 7200, a battery control unit 7300, a vehicle external information detection unit 7400, a vehicle internal information detection unit 7500, and an integrated control unit 7600. The communication network 7010 connecting the plurality of control units may be, for example, an in-vehicle communication network compliant with any of standards such as controller area network (CAN), local interconnect network (LIN), local area network (LAN), and FlexRay (registered trademark).

Each control unit includes a microcomputer that performs arithmetic processing according to various programs, a storage section that stores programs executed by the microcomputer, parameters used for various calculations, or the like, and a driving circuit that drives various devices to be controlled. Each control unit is equipped with a network I/F for communicating with other control units via the communication network 7010, and a communication I/F for communicating with devices, sensors, or the like inside and outside the vehicle by way of wired communication or wireless communication. FIG. 27 illustrates, as the functional configuration of the integrated control unit 7600, a microcomputer 7610, a general-purpose communication I/F 7620, a dedicated communication I/F 7630, a positioning section 7640, a beacon receiver 7650, an in-vehicle device I/F 7660, a sound/image output section 7670, an in-vehicle network I/F 7680, and a storage section 7690. Similarly, the other control units include microcomputers, communication I/Fs, storage sections, and the like.

The drive system control unit 7100 controls the operation of devices related to a drive system of a vehicle according to various programs. For example, the drive system control unit 7100 functions as a control device over a driving force generating device such as an internal combustion engine or a driving motor for generating a driving force of the vehicle, a driving force transmission mechanism for transmitting the driving force to wheels, a steering mechanism adjusting a steering angle of the vehicle, a braking device that generates a braking force of the vehicle, and the like. The drive system control unit 7100 may have a function as a control device such as an antilock brake system (ABS) or electronic stability control (ESC).

The drive system control unit 7100 is connected with a vehicle state detector 7110. The vehicle state detector 7110 includes, for example, at least one of a gyro sensor that detects the angular velocity of axial rotational movement of a vehicle body, an acceleration sensor that detects the acceleration of the vehicle, or sensors for detecting an amount of operation of an accelerator pedal, an amount of operation of a brake pedal, the steering angle of a steering wheel, an engine speed or the rotational speed of wheels, and the like. The drive system control unit 7100 performs arithmetic processing using a signal input from the vehicle state detector 7110, and controls the internal combustion engine, the driving motor, an electric power steering device, the brake device, and the like.

The body system control unit 7200 controls operations of various devices mounted on the vehicle body according to various programs. For example, the body system control unit 7200 functions as a keyless entry system, a smart key system, a power window device, or a control device for various lamps such as a headlamp, a backup lamp, a brake lamp, a blinker, or a fog lamp. In this case, radio waves transmitted from a mobile device as an alternative to a key or signals of various kinds of switches can be input to the body system control unit 7200. The body system control unit 7200 receives input of these radio waves or signals, and controls a door lock device, power window device, lamps, and the like of the vehicle.

The battery control unit 7300 controls a secondary battery 7310 that is a power supply source for the driving motor according to various programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device or the like provided to the battery device.

The vehicle external information detection unit 7400 detects information regarding the outside of the vehicle equipped with the vehicle control system 7000. For example, the vehicle external information detection unit 7400 is connected with at least one of an imaging section 7410 or a vehicle external information detector 7420. The imaging section 7410 includes at least one of a time of flight (ToF) camera, a stereo camera, a monocular camera, an infrared camera, or other cameras. The vehicle external information detector 7420 includes, for example, at least one of an environmental sensor for detecting current atmospheric conditions or weather conditions or a peripheral information detecting sensor for detecting another vehicle, an obstacle, a pedestrian, or the like around the vehicle equipped with the vehicle control system 7000.

The environmental sensor may be, for example, at least one of a raindrop sensor that detects rainy weather, a fog sensor that detects fog, a sunlight sensor that detects sunlight intensity, or a snow sensor that detects snowfall. The peripheral information detecting sensor may be at least one of an ultrasonic sensor, a radar device, or a light detection and ranging or laser imaging detection and ranging (LIDAR) device. Each of the imaging section 7410 and the vehicle external information detector 7420 may be provided as an independent sensor or device, or may be provided as a device in which a plurality of sensors or devices is integrated.

Figure 28:
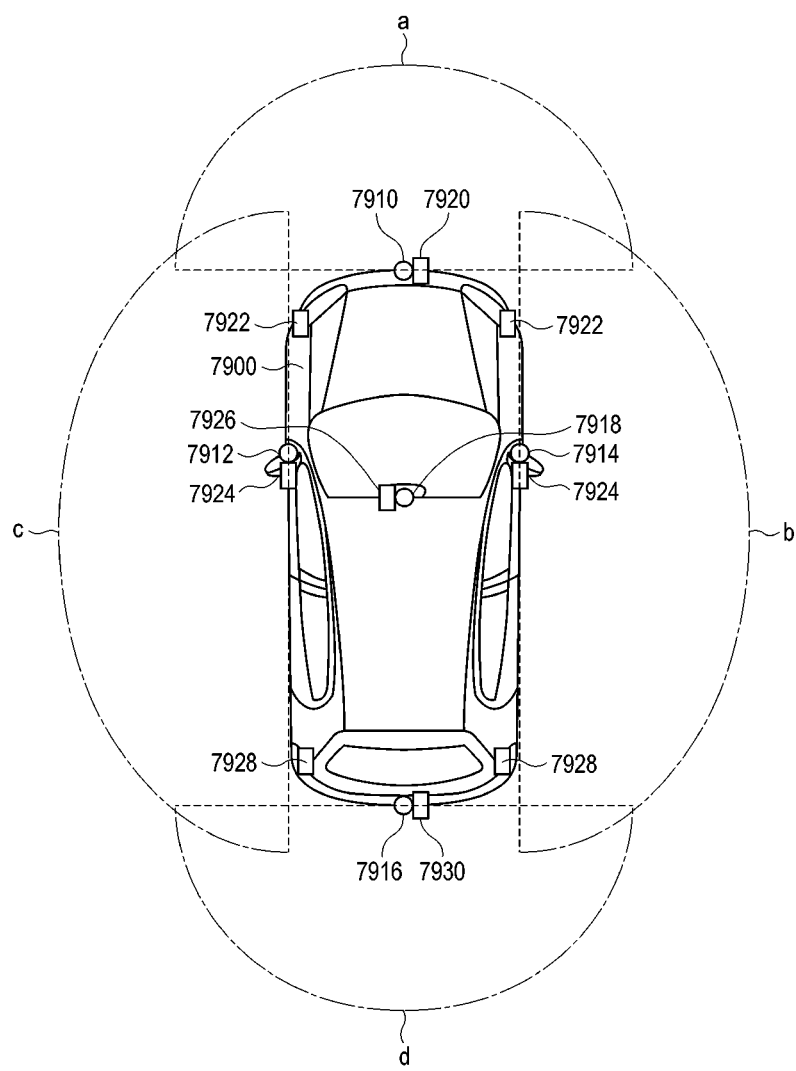
FIG. 28 is a diagram illustrating an example of installation positions of imaging sections and a vehicle external information detector.

Here, FIG. 28 shows an example of installation positions of the imaging section 7410 and the vehicle external information detector 7420. Imaging sections 7910, 7912, 7914, 7916, and 7918 are provided on, for example, at least one of positions on a front nose, sideview mirrors, a rear bumper, and a back door of the vehicle 7900 or an upper portion of a windshield within the interior of the vehicle. The imaging section 7910 provided on the front nose and the imaging section 7918 provided at the upper portion of the windshield within the interior of the vehicle acquire mainly an image of an environment in front of the vehicle 7900. The imaging sections 7912 and 7914 provided on the sideview mirrors acquire mainly an image of an environment on the side of the vehicle 7900. The imaging section 7916 provided on the rear bumper or the back door acquires mainly an image of an environment behind the vehicle 7900. The imaging section 7918 provided at the upper portion of the windshield within the interior of the vehicle is used mainly to detect a preceding vehicle, a pedestrian, an obstacle, a traffic light, a traffic sign, a lane, or the like.

Note that FIG. 28 shows an example of an imaging range of the respective imaging sections 7910, 7912, 7914, and 7916. An imaging range a indicates the imaging range of the imaging section 7910 provided on the front nose, imaging ranges b and c indicate the imaging ranges of the imaging sections 7912 and 7914 provided on the sideview mirrors, respectively, and an imaging range d indicates the imaging range of the imaging section 7916 provided on the rear bumper or the back door. A bird's-eye image of the vehicle 7900 as viewed from above can be obtained by superimposing image data captured by the imaging sections 7910, 7912, 7914, and 7916, for example.

Vehicle external information detectors 7920, 7922, 7924, 7926, 7928, and 7930 provided to the front, rear, sides, and corners of the vehicle 7900 and upper portion of the windshield within the interior of the vehicle may be an ultrasonic sensor or a radar device, for example. The vehicle external information detectors 7920, 7926, and 7930 provided to the front nose, the rear bumper, and the back door of the vehicle 7900 and at the upper portion of the windshield within the interior of the vehicle may be, for example, a LIDAR device. These vehicle external information detectors 7920 to 7930 are used mainly to detect a preceding vehicle, a pedestrian, an obstacle, or the like.

Returning back to FIG. 27, the description will be continued. The vehicle external information detection unit 7400 makes the imaging section 7410 capture an image outside the vehicle, and receives the captured image data. Further, the vehicle external information detection unit 7400 receives detection information from the vehicle external information detector 7420 connected thereto. In a case where the vehicle external information detector 7420 is an ultrasonic sensor, a radar device, or a LIDAR device, the vehicle external information detection unit 7400 transmits ultrasonic waves, electromagnetic waves, or the like, and receives information of the received reflected waves. The vehicle external information detection unit 7400 may perform, on the basis of the received information, processing of detecting an object such as a person, a vehicle, an obstacle, a road sign, or a character on a road surface, or processing of detecting the distance thereto. The vehicle external information detection unit 7400 may perform environment recognition processing for recognizing rainfall, fog, road surface conditions, or the like on the basis of the received information. The vehicle external information detection unit 7400 may calculate a distance to an object outside the vehicle on the basis of the received information.

Furthermore, on the basis of the received image data, the vehicle external information detection unit 7400 may perform image recognition processing of recognizing a person, a vehicle, an obstacle, a road sign, a character on a road surface, or the like, or processing of detecting a distance thereto. The vehicle external information detection unit 7400 may perform processing such as distortion correction or alignment on the received image data, and combine the image data captured by different imaging sections 7410 to generate a bird's-eye image or a panoramic image. The vehicle external information detection unit 7400 may perform viewpoint conversion processing using the image data captured by different imaging sections 7410.

The vehicle internal information detection unit 7500 detects information regarding the inside of the vehicle. For example, the vehicle internal information detection unit 7500 is connected with a driver condition detector 7510 that detects a condition of a driver. The driver condition detector 7510 may include a camera that captures an image of the driver, a biosensor that detects biological information of the driver, a microphone that collects sound within the interior of the vehicle, or the like. The biosensor is disposed in, for example, a seat surface, the steering wheel, or the like, and detects biological information of an occupant seated in a seat or the driver holding the steering wheel. On the basis of detection information input from the driver condition detector 7510, the vehicle internal information detection unit 7500 may calculate a degree of fatigue of the driver or a degree of concentration of the driver, or may determine whether or not the driver is dozing. The vehicle internal information detection unit 7500 may perform processing such as noise canceling processing on an audio signal of collected sound.

The integrated control unit 7600 controls general operation within the vehicle control system 7000 in accordance with various kinds of programs. The integrated control unit 7600 is connected with an input section 7800. The input section 7800 is implemented by, for example, a device capable of input operation by an occupant, such as a touch panel, a button, a microphone, a switch, or a lever. The integrated control unit 7600 may be supplied with data obtained by voice recognition of voice input through the microphone. The input section 7800 may be, for example, a remote control device using infrared rays or other radio waves, or an external connecting device corresponding to the operation of the vehicle control system 7000, such as a mobile telephone or a personal digital assistant (PDA). The input section 7800 may be, for example, a camera. In that case, an occupant can input information by gesture. Alternatively, data may be input which is obtained by detecting the movement of a wearable device worn by the occupant. Moreover, the input section 7800 may include, for example, an input control circuit or the like that generates an input signal on the basis of information input by the occupant or the like using the above-described input section 7800 and that outputs the generated input signal to the integrated control unit 7600. The occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD), a semiconductor storage device, an optical storage device, a magneto-optical storage device, or the like.

The general-purpose communication I/F 7620 is a generic communication I/F that mediates communication with various apparatuses present in an external environment 7750. The general-purpose communication I/F 7620 may implement a cellular communication protocol such as global system of mobile communications (GSM) (registered trademark), worldwide interoperability for microwave access (WiMAX), long term evolution (LTE), or LTE-advanced (LTE-A), or another wireless communication protocol such as wireless LAN (referred to also as wireless fidelity (Wi-Fi) (registered trademark)) or Bluetooth (registered trademark). The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal (for example, a terminal of the driver, a pedestrian, or a store, or a machine type communication (MTC) terminal) present in the vicinity of the vehicle using a peer to peer (P2P) technology, for example.

The dedicated communication I/F 7630 is a communication I/F that supports a communication protocol developed for use in vehicles. The dedicated communication I/F 7630 may implement, for example, a standard protocol, such as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of vehicle to vehicle communication, vehicle to infrastructure communication, vehicle to home communication, and vehicle to pedestrian communication.

The positioning section 7640, for example, performs positioning by receiving a global navigation satellite system (GNSS) signal from a GNSS satellite (for example, a global positioning system (GPS) signal from a GPS satellite), and generates positional information including the latitude, longitude, and altitude of the vehicle. Note that the positioning section 7640 may identify a current position by exchanging signals with a wireless access point, or may obtain the positional information from a terminal such as a mobile telephone, a personal handyphone system (PHS), or a smart phone that has a positioning function.

The beacon receiver 7650, for example, receives radio waves or electromagnetic waves transmitted from a radio station installed on a road or the like, and thereby obtains information about the current position, congestion, a closed road, a necessary time, or the like. Note that the function of the beacon receiver 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless USB (WUSB). In addition, the in-vehicle device I/F 7660 may establish wired connection by universal serial bus (USB), high-definition multimedia interface (HDMI) (registered trademark), mobile high-definition link (MHL), or the like via a connection terminal (and a cable if necessary) not shown in the figures. The in-vehicle device 7760 may, for example, include at least one of a mobile device or a wearable device carried by an occupant or an information device carried into or attached to the vehicle. The in-vehicle device 7760 may also include a navigation device that searches for a route to a destination of choice. The in-vehicle device I/F 7660 exchanges control signals or data signals with these in-vehicle devices 7760.

The in-vehicle network I/F 7680 is an interface that mediates communication between the microcomputer 7610 and the communication network 7010. The in-vehicle network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiver 7650, the in-vehicle device I/F 7660, or the in-vehicle network I/F 7680. For example, the microcomputer 7610 may calculate a control target value for the driving force generating device, the steering mechanism, or the braking device on the basis of the obtained information about the inside and outside of the vehicle, and output a control command to the drive system control unit 7100. For example, the microcomputer 7610 may perform cooperative control intended to implement functions of an advanced driver assistance system (ADAS) which include collision avoidance or shock mitigation for the vehicle, following driving based on distance between vehicles, vehicle speed maintaining driving, a warning of collision of the vehicle, a warning of departure of the vehicle from a lane, or the like. In addition, the microcomputer 7610 may perform cooperative control intended for automated driving, which makes the vehicle travel automatedly without relying on the operation of the driver, or the like, by controlling the driving force generating device, the steering mechanism, the braking device, or the like on the basis of the obtained information about the surrounding situation of the vehicle.

The microcomputer 7610 may generate three-dimensional distance information between the vehicle and an object, such as a structure or a person, around the vehicle, and generate local map information including information about the surrounding situation of the current position of the vehicle, on the basis of information obtained via at least one of the general-purpose communication I/F 7620, the dedicated communication I/F 7630, the positioning section 7640, the beacon receiver 7650, the in-vehicle device I/F 7660, or the in-vehicle network I/F 7680. In addition, the microcomputer 7610 may predict danger such as collision of the vehicle, approaching of a pedestrian or the like, an entry to a closed road, or the like, on the basis of the obtained information, and generate a warning signal. The warning signal may be, for example, a signal for producing a warning sound or lighting a warning lamp.

The sound/image output section 7670 transmits an output signal of at least one of a sound or an image to an output device capable of visually or auditorily giving information to an occupant of the vehicle or the outside of the vehicle. In the example of FIG. 24, an audio speaker 7710, a display section 7720, and an instrument panel 7730 are illustrated as the output device. The display section 7720 may include, for example, at least one of an on-board display or a head-up display. The display section 7720 may have an augmented reality (AR) display function. The output device may be a device other than these devices. For example, the output device may be a wearable device such as headphones or an eyeglass type display worn by an occupant, a projector, a lamp, or the like. In a case where the output device is a display device, the display device visually displays results obtained by various kinds of processing performed by the microcomputer 7610 or information received from another control unit in various forms such as text, an image, a table, or a graph. In addition, in a case where the output device is a sound output device, the sound output device converts an audio signal constituted of reproduced audio data or sound data or the like into an analog signal, and auditorily outputs the analog signal.

Note that at least two control units connected to each other via the communication network 7010 in the example shown in FIG. 24 may be integrated into one control unit. Alternatively, each individual control unit may include a plurality of control units. Further, the vehicle control system 7000 may include another control unit not shown in the figures. Furthermore, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

An example of the vehicle control system to which the technology according to the present disclosure can be applied has been described above. The technology according to the present disclosure is applicable to, for example, the imaging sections 7910, 7912, 7914, 7916, and 7918, the vehicle external information detectors 7920, 7922, 7924, 7926, 7928, and 7930, the driver condition detector 7510, or the like in the configuration described above. Specifically, the imaging device 100 of FIG. 1 in the present disclosure can be applied to these imaging sections and detectors. Then, by applying the technology according to the present disclosure, an influence of a noise event such as sensor noise can be mitigated, and the occurrence of a true event can be reliably and quickly sensed, so that safe vehicle traveling can be achieved.

It is to be noted that the present technology may also have the following configurations.

(1) An imaging device including:
  a pixel array section including a plurality of dynamic vision sensor (DVS) pixels that outputs an output signal according to an amount of light, and a plurality of first circuits that respectively corresponds to the plurality of DVS pixels and outputs a detection signal indicating occurrence of an address event in a case where the output signal of the corresponding DVS pixel exceeds a predetermined threshold value;
  a second circuit section capable of performing power consumption corresponding to the plurality of DVS pixels and the plurality of first circuits according to a control signal; and
  a control circuit that has a first control period in which the plurality of first circuits is driven and a second control period in which the plurality of first circuits is not driven, the control circuit performing control to drive the second circuit section during the second control period using the control signal.

(2) The imaging device according (1), in which
the second circuit section includes
a plurality of pixels that outputs output signals in accordance with the control signal.

(3) The imaging device according to (2), in which each of the plurality of pixels outputs an output signal according to a voltage to be applied.

(4) The imaging device according to (3), in which
the second circuit section further includes
a plurality of second circuits that outputs a detection signal indicating occurrence of an address event in a case where the output signal of the corresponding pixel exceeds a predetermined threshold value.

(5) The imaging device according to (4), in which
the second circuit section is capable of adjusting power consumption according to a voltage to be applied, and
the imaging device further includes a first voltage source that applies a voltage to the second circuit section according to the control signal.

(6) The imaging device according to claim 5), in which
in the second circuit section, power consumption is different between a first potential to be applied and a second potential higher than the first potential, and
the first voltage source is capable of outputting a pulsed voltage that repeats a period of the first potential and a period of the second potential higher than the first potential according to the control signal.

(7) The imaging device according to claim 6), in which each of the plurality of second circuits does not exceed the predetermined threshold value at the first potential, and exceeds the predetermined threshold value at the second potential.

(8) The imaging device according to (7), in which the controller is capable of outputting a plurality of pulsed voltages, and changes a pattern of the pulsed voltages according to power consumption of the plurality of DVS pixels and the plurality of first circuits.

(9) The imaging device according to claim 8), in which the controller changes the pattern of the pulsed voltages according to a number of address events detected by the plurality of first circuits at a predetermined time interval.

(10) The imaging device according to claim 9), in which the controller changes the pattern of the pulsed voltages according to a number of address events detected by the plurality of first circuits for several rows from a last row in terms of a reading order.

(11) The imaging device according to (4), in which the second circuit section is capable of adjusting power consumption according to a voltage to be applied, the imaging device further includes a first voltage source that applies a voltage to the second circuit section in response to the control signal, and a second voltage source having a potential lower than a potential of the first voltage source, and in the second circuit section, power consumption is different according to a potential difference between the first voltage source and the second voltage source.

(12) The imaging device according to (11), in which each of the plurality of pixels is connected between the first voltage source and the second voltage source, and a number of the plurality of pixels exceeding the predetermined threshold value is controllable according to the potentials of the first voltage source and the second voltage source.

(13) The imaging device according to any one of (1) to (12), in which
the pixel array section further includes a plurality of gradation pixels, and
the imaging device is capable of generating a DVS image based on output signals of the plurality of DVS pixels and a gradation image based on output signals of the plurality of gradation pixels.

(14) The imaging device according to any one of (1) to (13), in which the plurality of DVS pixels is arranged in a matrix in the pixel array section, and output signals are read according to an order of rows of the pixel array section.

(15) The imaging device according to any one of (1) to (14), in which the second control period corresponds to a vertical blanking period of the plurality of DVS pixels.

(16) The imaging device according to any one of (1) to (14), in which the second control period corresponds to a horizontal blanking period of the plurality of DVS pixels.

(17) An imaging method for a pixel array section including a plurality of dynamic vision sensor (DVS) pixels that outputs an output signal according to an amount of light and a plurality of first circuits that respectively corresponds to the plurality of DVS pixels and outputs a detection signal indicating occurrence of an address event in a case where the output signal of the corresponding DVS pixel exceeds a predetermined threshold value,
the method including a first control period in which the plurality of first circuits is driven and a second control period in which the plurality of first circuits is not driven,
the method including
driving a second circuit section in the second control period, the second circuit section being capable of performing power consumption corresponding to the plurality of DVS pixels and the plurality of first circuits.

The modes of the present disclosure are not limited to the above-described individual embodiments, and include various modifications that could be conceived of by those skilled in the art. In addition, the effects of the present disclosure are not limited to the effects described above. That is, various additions, modifications, and partial deletions are possible without departing from the conceptual idea and spirit of the present disclosure derived from the matters defined in the claims and equivalents thereof.

REFERENCE SIGNS LIST

30 Pixel array section
30b Adjustment pixel block
100 Imaging device
200 Solid-state imaging element
211b Second access control circuit
308a Gradation pixel
308ab DVS pixel
308c Dummy DVS pixel
314 DVS AFE
316 Dummy DVS AFE
3080c Dummy DVS pixel
3080b DVS pixel

The invention claimed is:

1. An imaging device comprising:
a pixel array section including a plurality of dynamic vision sensor (DVS) pixels that outputs an output signal according to an amount of light, and a plurality of first circuits that respectively corresponds to the plurality of DVS pixels and outputs a detection signal indicating occurrence of an address event in a case where the output signal of a corresponding DVS pixel exceeds a predetermined threshold value;
a second circuit section capable of performing power consumption corresponding to the plurality of DVS pixels and the plurality of first circuits according to a control signal; and
a control circuit that has a first control period in which the plurality of first circuits is driven and a second control period in which the plurality of first circuits is not driven, the control circuit performing control to drive the second circuit section during the second control period using the control signal.

2. The imaging device according to claim 1, wherein the second circuit section includes the plurality of DVS pixels that outputs output signals in accordance with the control signal.

3. The imaging device according to claim 2, wherein each of the plurality of DVS pixels outputs the output signal according to a voltage to be applied.

4. The imaging device according to claim 3, wherein the second circuit section further includes
a plurality of second circuits that outputs a detection signal indicating occurrence of an address event in a case where the output signal of the corresponding DVS pixel exceeds a predetermined threshold value.

5. The imaging device according to claim 4, wherein the second circuit section is capable of adjusting power consumption according to the voltage to be applied, and
the imaging device further includes a first voltage source that applies a voltage to the second circuit section according to the control signal.

6. The imaging device according to claim 5, wherein in the second circuit section, power consumption is different between a first potential to be applied and a second potential higher than the first potential, and
the first voltage source is capable of outputting a pulsed voltage that repeats a period of the first potential and a period of the second potential higher than the first potential according to the control signal.

7. The imaging device according to claim 6, wherein each of the plurality of second circuits does not exceed the predetermined threshold value at the first potential, and exceeds the predetermined threshold value at the second potential.

8. The imaging device according to claim 7, wherein a controller is capable of outputting a plurality of pulsed voltages, and changes a pattern of the pulsed voltages according to power consumption of the plurality of DVS pixels and the plurality of first circuits.

9. The imaging device according to claim 8, wherein the controller changes the pattern of the pulsed voltages according to a number of address events detected by the plurality of first circuits at a predetermined time interval.

10. The imaging device according to claim 9, wherein the controller changes the pattern of the pulsed voltages according to a number of address events detected by the plurality of first circuits for several rows from a last row in terms of a reading order.

11. The imaging device according to claim 4, wherein
the second circuit section is capable of adjusting power consumption according to a voltage to be applied,
the imaging device further includes a first voltage source that applies a voltage to the second circuit section in response to the control signal, and a second voltage source having a potential lower than a potential of the first voltage source, and
in the second circuit section, power consumption is different according to a potential difference between the first voltage source and the second voltage source.

12. The imaging device according to claim 11, wherein each of the plurality of DVS pixels is connected between the first voltage source and the second voltage source, and a number of the plurality of DVS pixels exceeding the predetermined threshold value is controllable according to potentials of the first voltage source and the second voltage source.

13. The imaging device according to claim 1, wherein
the pixel array section further includes a plurality of gradation pixels, and
the imaging device is capable of generating a DVS image based on output signals of the plurality of DVS pixels and a gradation image based on output signals of the plurality of gradation pixels.

14. The imaging device according to claim 1, wherein the plurality of DVS pixels is arranged in a matrix in the pixel array section, and output signals are read according to an order of rows of the pixel array section.

15. The imaging device according to claim 1, wherein the second control period corresponds to a vertical blanking period of the plurality of DVS pixels.

16. The imaging device according to claim 1, wherein the second control period corresponds to a horizontal blanking period of the plurality of DVS pixels.

17. An imaging method for a pixel array section, including:
a plurality of dynamic vision sensor (DVS) pixels that outputs an output signal according to an amount of light and a plurality of first circuits that respectively corresponds to the plurality of DVS pixels and outputs a detection signal indicating occurrence of an address event in a case where the output signal of a corresponding DVS pixel exceeds a predetermined threshold value,
the method including a first control period in which the plurality of first circuits is driven and a second control period in which the plurality of first circuits is not driven,
the method comprising:
driving a second circuit section in the second control period, the second circuit section being capable of performing power consumption corresponding to the plurality of DVS pixels and the plurality of first circuits.

* * * * *